United States Patent [19]

Guilino et al.

[11] Patent Number: 5,061,058
[45] Date of Patent: * Oct. 29, 1991

[54] OPTHALMIC LENS FOR USE IN THE CORRECTION OF ASTIGMATISM

[75] Inventors: Günther Guilino; Herbert Pfeiffer; Helmut Altheimer, all of Munich, Fed. Rep. of Germany

[73] Assignee: Optische Werke G. Rodenstock, Munich, Fed. Rep. of Germany

[ * ] Notice: The portion of the term of this patent subsequent to Aug. 15, 2006 has been disclaimed.

[21] Appl. No.: 327,801

[22] PCT Filed: Jul. 18, 1988

[86] PCT No.: PCT/DE88/00443
§ 371 Date: May 18, 1989
§ 102(e) Date: May 18, 1989

[87] PCT Pub. No.: WO89/00710
PCT Pub. Date: Jan. 26, 1989

[30] Foreign Application Priority Data

Jul. 18, 1988 [DE] Fed. Rep. of Germany ....... 3723853

[51] Int. Cl.$^5$ .............................................. G02C 7/02
[52] U.S. Cl. ..................................... 351/176; 359/652
[58] Field of Search ................. 350/413; 351/159, 176

[56] References Cited

U.S. PATENT DOCUMENTS 3,486,808 12/1969 Hamblen ............................. 350/413
4,856,889 8/1989 Guilino et al. ...................... 351/176

Primary Examiner—Scott J. Sugarman
Attorney, Agent, or Firm—Antonelli, Terry & Stout & Kraus

[57] ABSTRACT

An ophthalmic lens for use in the correction of astigmation, wherein in order to reduce the critical thickness and/or the variation of the edge thickness along the circumference of the lens, the refractive index changes at least along the critical main section in such a manner that at least part of the cylindrical correction is attained by the refractive index variation.

8 Claims, 25 Drawing Sheets

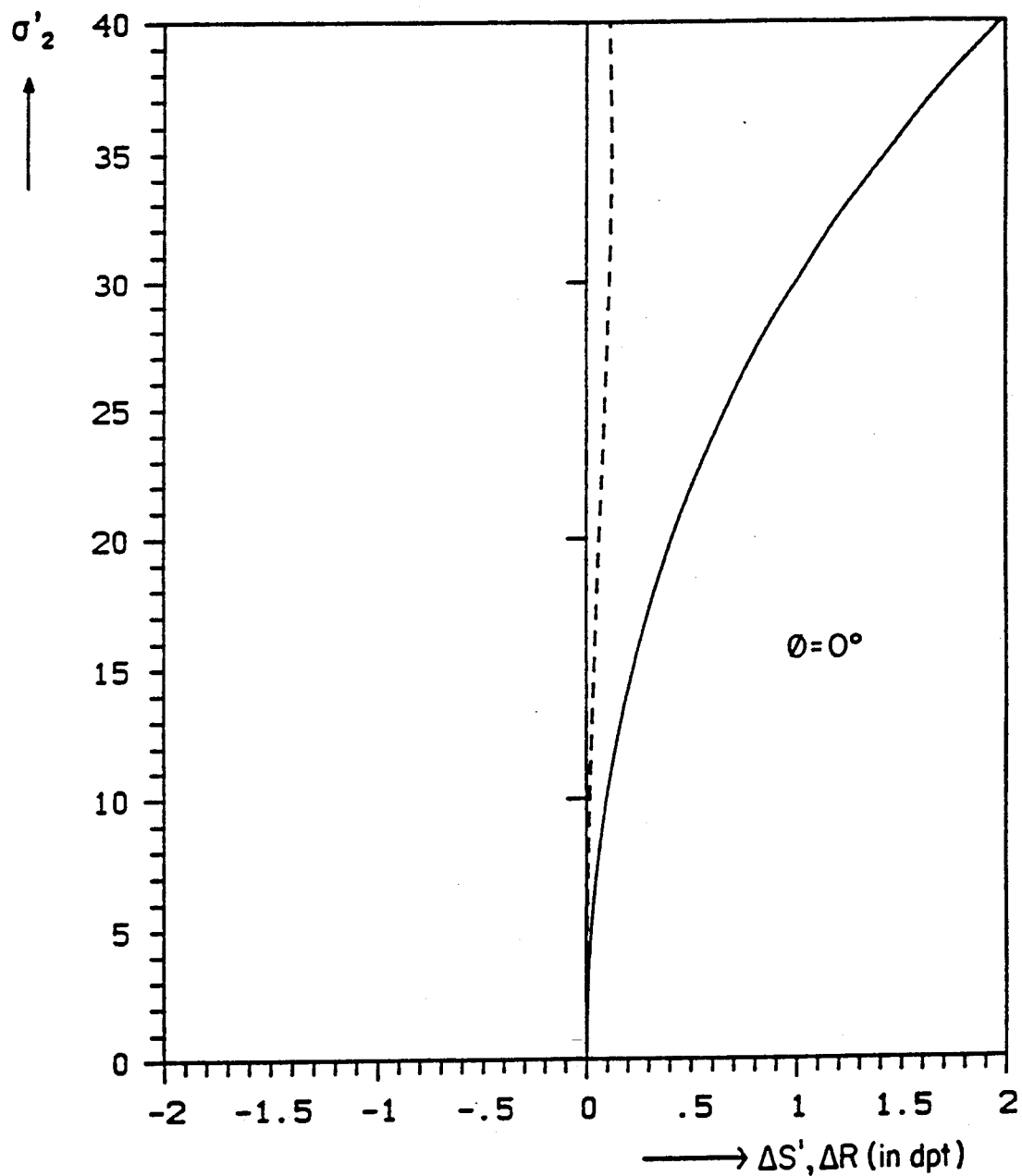

FIG. 13
FIG. 14
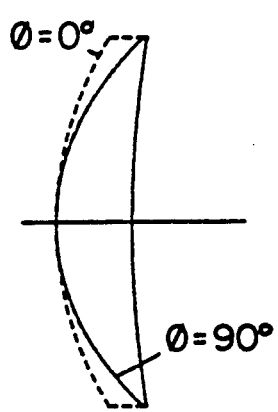
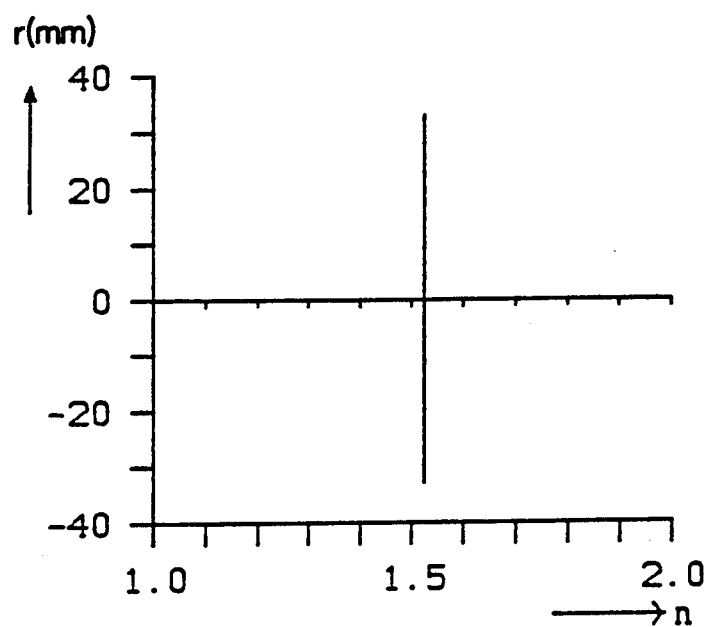

OPTHALMIC LENS FOR USE IN THE CORRECTION OF ASTIGMATISM

FIELD OF THE INVENTION

The present invention relates to an ophthalmic lens for use in the correction of astigmatism.

STATE OF THE ART

Ophthalmic lenses with astigmatic action usually have a spherical and a toric surface. Lenses of this kind have a number of disadvantages:

Aberrations are only optimumly corrected for the vertex of the lens, while increasing along the main sections as well as between the main sections toward the edge. In lenses of positive power, center thickness is very great and in lenses of negative power, the thickness of the edge is quite great, moreover, the edge thickness varies along the circumference of the lens due to the toricity of the lens, the latter being extremely bothersome in lenses in so-called rimless frames.

Furthermore, if there is a marked difference in sight impairment between the two eyes, the two lenses will also differ considerably in appearance.

Although aberrations may be diminished by means of aspherical main sections, by way of illustration conical sections, the reduction in thickness that can be achieved is rather minimal.

DESCRIPTION OF THE INVENTION

The object of the present invention is to provide an ophthalmic lens for use in the correction of astigmatism, in which the critical thickness, i.e. the center thickness in the case of lenses of positive power and the thickness of the edge in the case of lenses of negative power and/or the variation in the edge thickness along the circumference of the lens, is substantially reduced compared to the state of the art.

An inventive solution to the foregoing object and its further embodiments are set forth in the claims hereto:

In accordance with the present invention it was understood that a considerable reduction in the critical thickness and/or the variation of the edge thickness along the circumference of the lens can be attained by changing the refractive index in the case of plus lenses at least along the stronger refracting main section and in the case of minus lenses at least along the lower refracting main section so that at least part of the cylindrical correction is achieved by changing the refractive index. As in plus lenses, the critical thickness, that is the center thickness or the edge thickness, is determined by the higher refracting main section and in minus lenses by the (in a mathematical sense) lower refracting main section hereinafter this main section will be called the critical main section. Accordingly the other main section will be called the non-critical main section.

Of course, it is also possible within the scope of the inventive concept to change the refractive index in the direction of the other main section and/or in the direction of the optical axis of the lens in addition to changing the refractive index along the critical main section. In this manner, aberrations can be kept at a minimum over the entire ophthalmic lens.

In any event, it is, however, advantageous if the change in the refractive index along the (in a mathematical sense) lower refracting main section is mirror symmetrical to the plane of the second (non-critical) main section.

In most cases of utilization, however, the further embodiment in which the refractive index only changes along the critical main section suffices completely. Strikingly, it is not only possible to reduce the critical thickness considerably with such a simple—one-dimensional—variation of the refractive index, but it is also possible to maintain specific predetermined conditions regarding image properties and, in particular, the quantity of the aberrations along the critical main section, i.e. it is possible to maintain two or even more quantities under predetermined restrictions by changing a single parameter.

Furthermore, the one-dimensional design of the gradient of the refractive index has the advantage that it can be produced comparatively simply. Nonetheless, such a one-dimensional gradient has not hitherto been considered in the relative literature. With regard to this, reference is made to, by way of illustration, the survey "Technological Trends-Gradient Index Optics" in Photonics Spectra, March 1987, p. 71ff and especially to the section on p. 71 "Types of Gradients".

Complete elimination of the variation of the edge thickness and at the same time a very sizable reduction of the critical thickness, i.e. the center thickness in lenses of positive power amd the edge thickness in lenses of negative power or both quantities in lenses in which a main section has positive power and a main section has negative power is yielded by the further embodiment in which the up to medium cylindrical correction, i.e. cylindrical correction ranging approximately between 2-3 dpt., is solely achieved by changing the refractive index. In this manner, namely, it is possible to utilize lenses with rotationally symmetrical surfaces so that no variation of the edge thickness can occur.

Aspheric surfaces may, naturally, be employed as rotationally symmetrical surfaces, being preferred, by way of illustration, in the case of major corrections for in that event the critical thickness and, particularly, the center thickness in lenses of positive power can be reduced considerably. Moreover, aberrations can at least be substantially reduced along both main sections by using aspheric rotationally symmetrical surfaces. Furthermore, atoric surfaces may also be used. i.e. surfaces deviating from the toric form and in which at least one main section is aspheric in design.

In many possible applications it is, however, quite sufficient if both surfaces are spherical surfaces hereto.

Further, the present invention provides for a suitable a dimension for the refractive index or refractive index change in the immediate vicinity of the optical axis.

BRIEF DESCRIPTION OF THE DRAWING

The present invention is made more apparent in the following section using preferred embodiments with reference to the accompanying drawing, in which:

FIGS. 9 to 12 show the astigmatic deviation and the focussing error for an invented ophthalmic lens having a cylindrical correction of +2 dpt., FIG. 13 shows a lens section, FIG. 14 shows the change in the refractive index.

DESCRIPTION OF THE PREFERRED EMBODIMENTS

Figure 1:
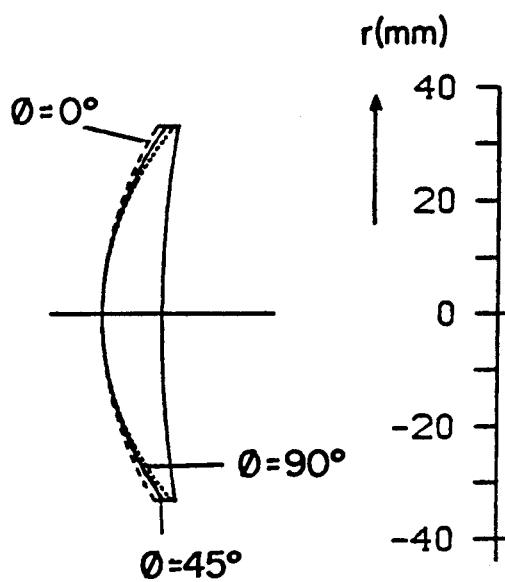
FIG. 1 shows a lens section.
Figure 2:
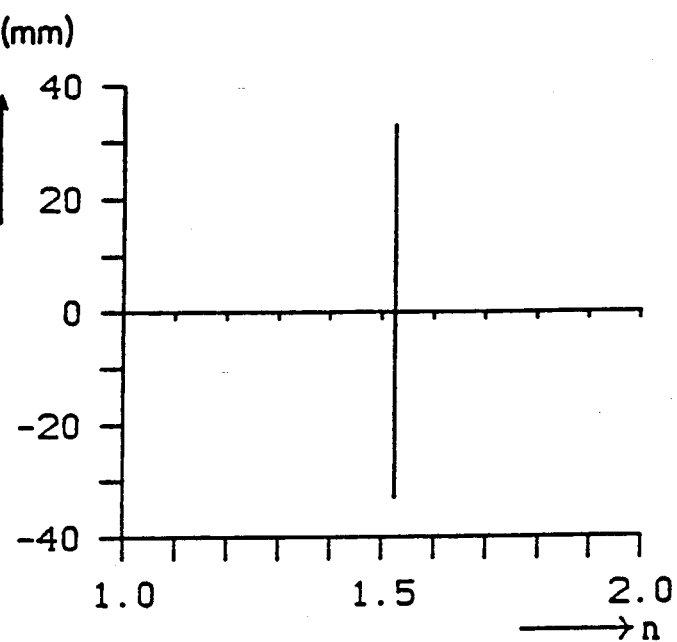
FIG. 2 shows the course of the refractive index.
Figure 3:
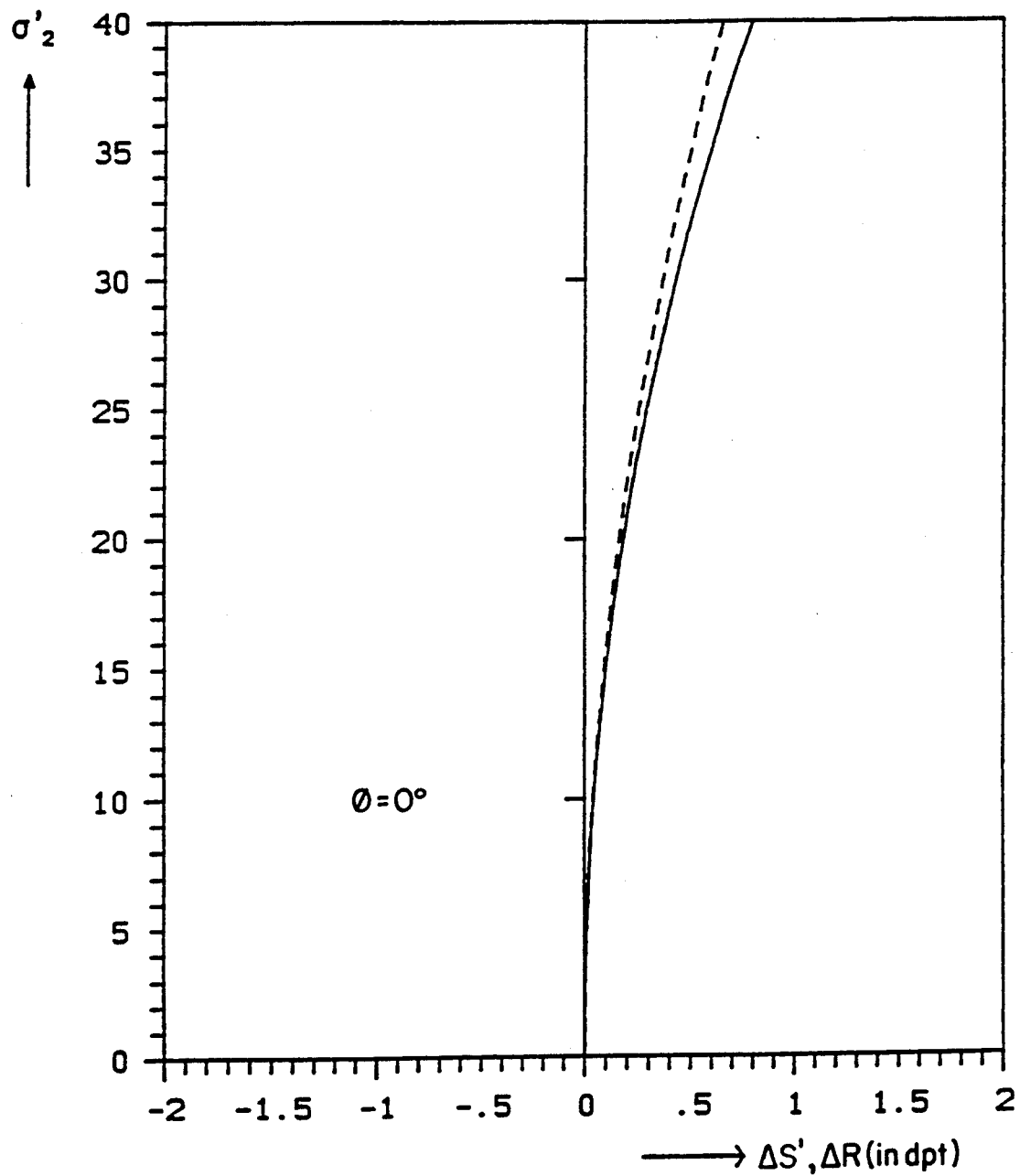
FIGS. 3 to 6 show the astigmatic deviation and the focussing error for a prior art ophthalmic lens having a cylindrical correction of +2 dpt.
Figure 4:
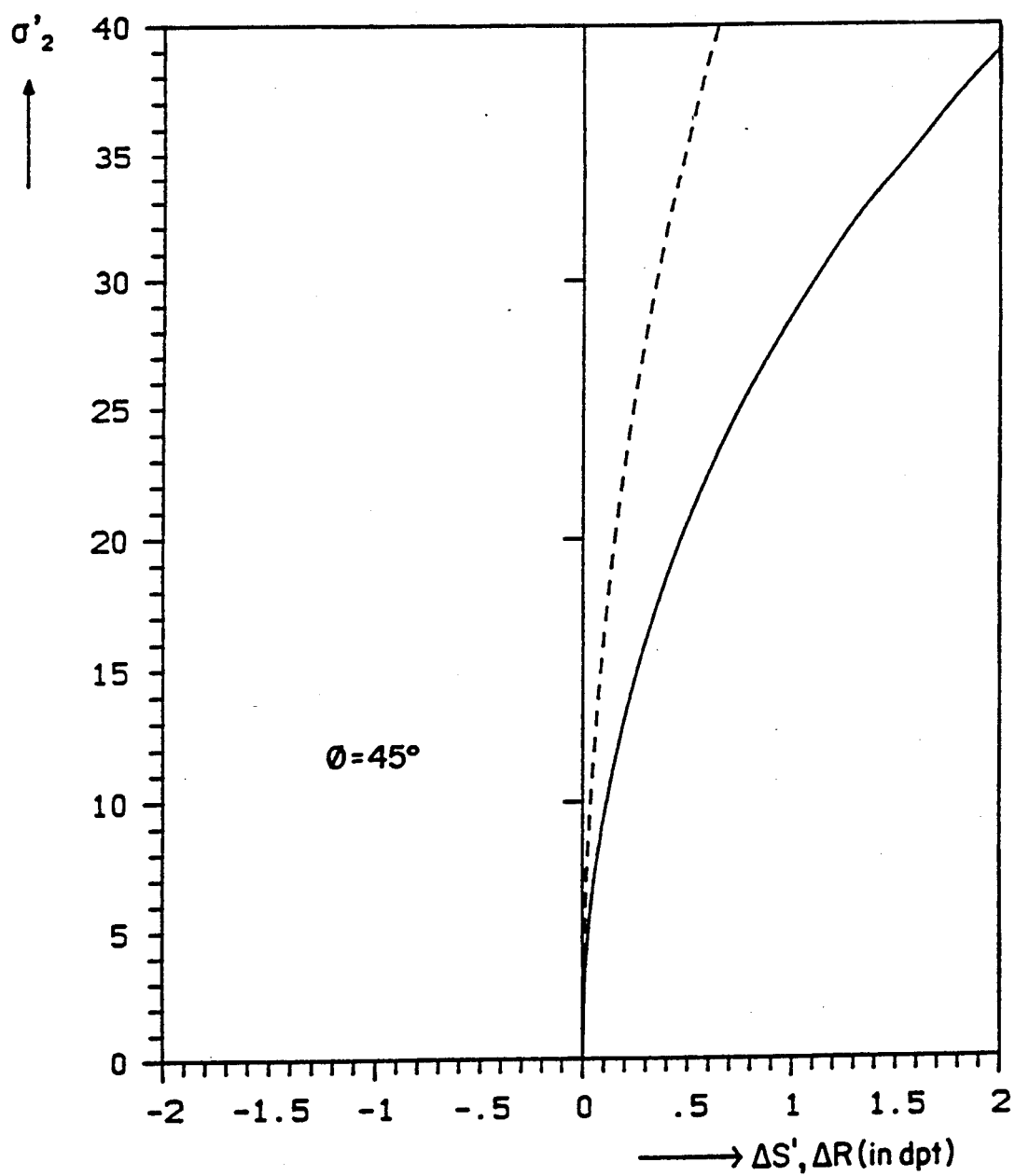
Figure 5:
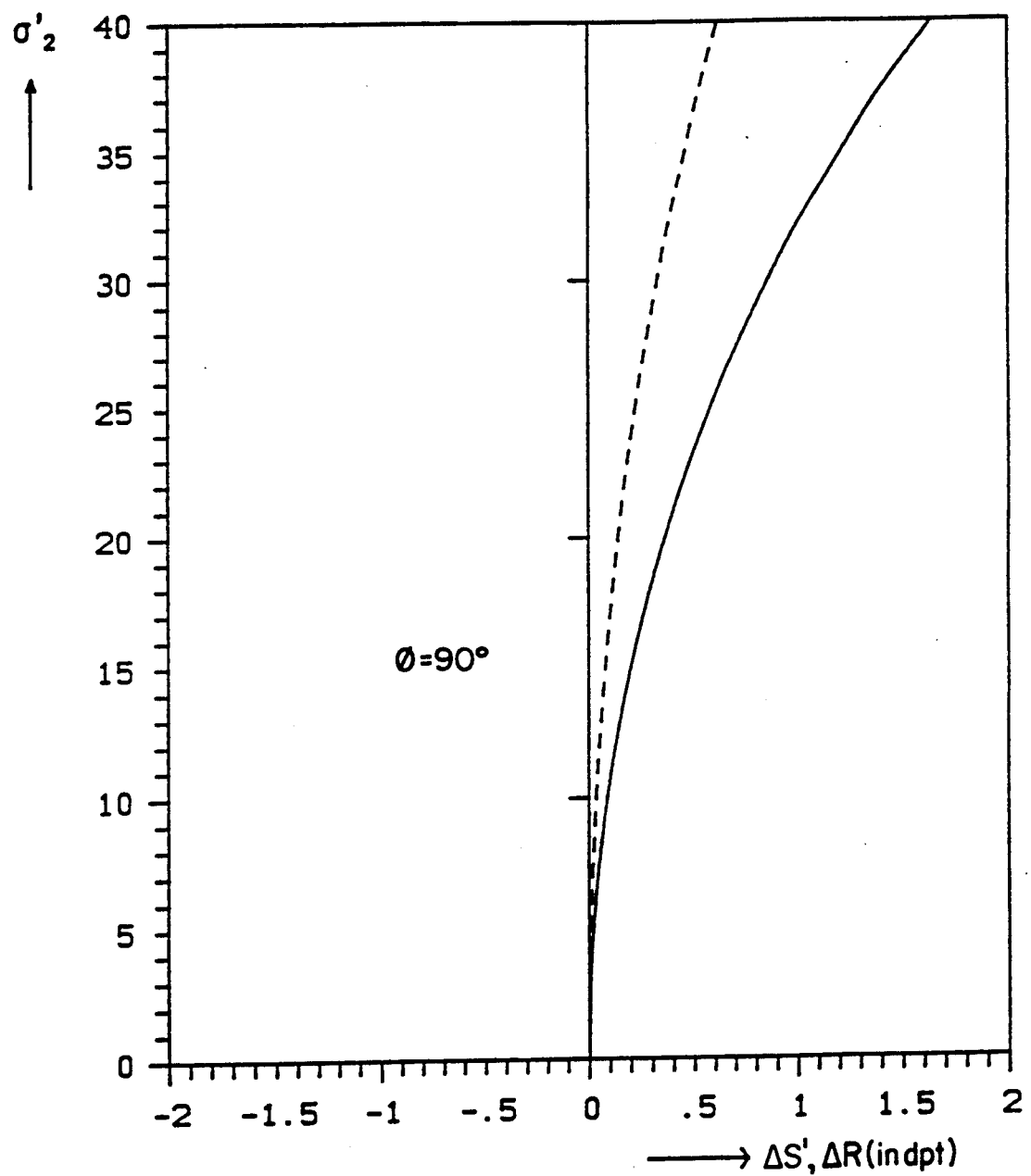

All the figures are based on a system of coordinates in which the x-axis runs horizontally and the y-axis runs vertically. The origin of the coordinate system lies in the geometrical center of the lens.

The angle $\sigma'$ is the so-called eye facing angle of vision, in other words the half aperature angle of the cone of vision.

The angle $\phi$ is a polar angle (azimuth angle), in which:

x-axis: $\phi=0°$,
y-axis: $=90°$;

In FIGS. 1, 7a and 7b, 13, 19a and 19b as well as 25a and 25 illustrate sections of the respective ophthalmic lens for section planes $\phi=0°$ and 90° and sometimes also for $=45°$. These sections are designated 0°, 45°, 90° respectively.

FIGS. 2, 8a and 8b, 14, 20a and 20b as well as 26a and 26b depict the course of the refractive index n on the abscissa as a function of the distance plotted on the ordinate in the respective section plane $\phi=$const seen in this figure as a function of the angle $\sigma'$ or as a function of the angle $\phi$ (ordinate) for the section planes $\phi=$const. In the case of the figures having $=$const the ordinate of these figures is also the ordinate for the "lens section" shown on the left.

The curves showing the refractive index are corresponding-to designated 0°, 45°, 90° for the section plane $\phi=0°$, 45°, 90° or with $\sigma'=30°$ if the angle $\sigma'$ is maintained constant.

FIGS. 3-6, 9-12, 15-18, 21-24 and 27-30 illustrate the astigmatic deviation S' (unbroken lines) and the focussing error R (broken lines), i.e. the mean deviation from the prescription value, of the system ophthalmic lens/eye in centering with a distance eye center of rotation point/back vertex of the lens b'=28 mm, whereby the optical eye center of rotation lies on the optical axis of the lens.

Furthermore, in calculating the curves it was assumed that the "cylindrical axis" of the eye in resting position lies in the x-axis only moving parallel to the horizontal plane during vision motion. Of course, other "eye models" may also be used as the basis for calculating the eye/ophthalmic lens system, by way of illustration the Listing principle, whereby partially better results are received for the invented lenses, i.e. smaller values for the astigmatic deviation S' and focussing error R.

FIGS. 1 to 6 show a customary ophthalmic lens with a cylindrical correction of +2 dpt and a cylindrical axis of $(\phi=)$ 0° as well as a uniform refractive index n=1.525.

The front surface is a barrel-shaped torus having a vertex refractive power $D_{ji}=(n-1)/r_{ji}$, whereby $r_{ji}$ is the radius of curvature of the surface j in the section i.

$D_{1x}=6.75$ dpt.
$D_{1y}=8.59$ dpt.

The surface facing the eye is - as in all the preferred embodiments described hereinafter - a spherical surface with $$D_{2x}=D_{2y}=-2.00 \; dpt.$$

If such an ophthalmic lens has a diameter of 66 mm and a
mimimum edge thickness of 0.50 mm
its maximum edge thickness is 2.8 mm
and its center thickness 8.09 mm.

Thus the ophthalmic lens has a spherical correction of 5.0 dpt and a cylindrical correction of +2.00 dpt with an axis of 0°.

FIGS. 7 to 12 depict an ophthalmic lens of the invention having a cylindrical correction of +2 dpt and a cylindrical axis of $(\phi=)$ 0° as well as a changing refractive index in accordance with the present invention, the variation of which is depicted in FIG. 8 for various values of $\phi$ or $\sigma'$.

The front surface as well as the surface facing the eye are spherical surfaces with a vertex refractive power D $$D_{1x}=D_{1y}=6.82 \; dpt.$$

$$D_{2x}=D_{2y}=-2.00 \; dpt.$$

The cylindrical correction is produced by changing the refractive index n, which is a function of y.

If such an ophthalmic lens has a diameter of 66 mm and a uniform edge thickness of 0.50 mm
its center thickness is 5.85 mm.

A comparison of the invented ophthalmic lens and a customary lens reveals the following:

The center thickness, i.e. the critical thickness in an ophthalmic lens of positive power is reduced by approximately 27% and the maximum edge thickness by approximately 80% without worsening the aberrations. On the contrary, compared to a customary toric lens with a spherical main section, the invented ophthalmic lens has even more advantageous image properties. In particular, the focussing error R does not acquire any positive values worth mentioning, thus can be compensated for by negligible adaption.

Figure 6:
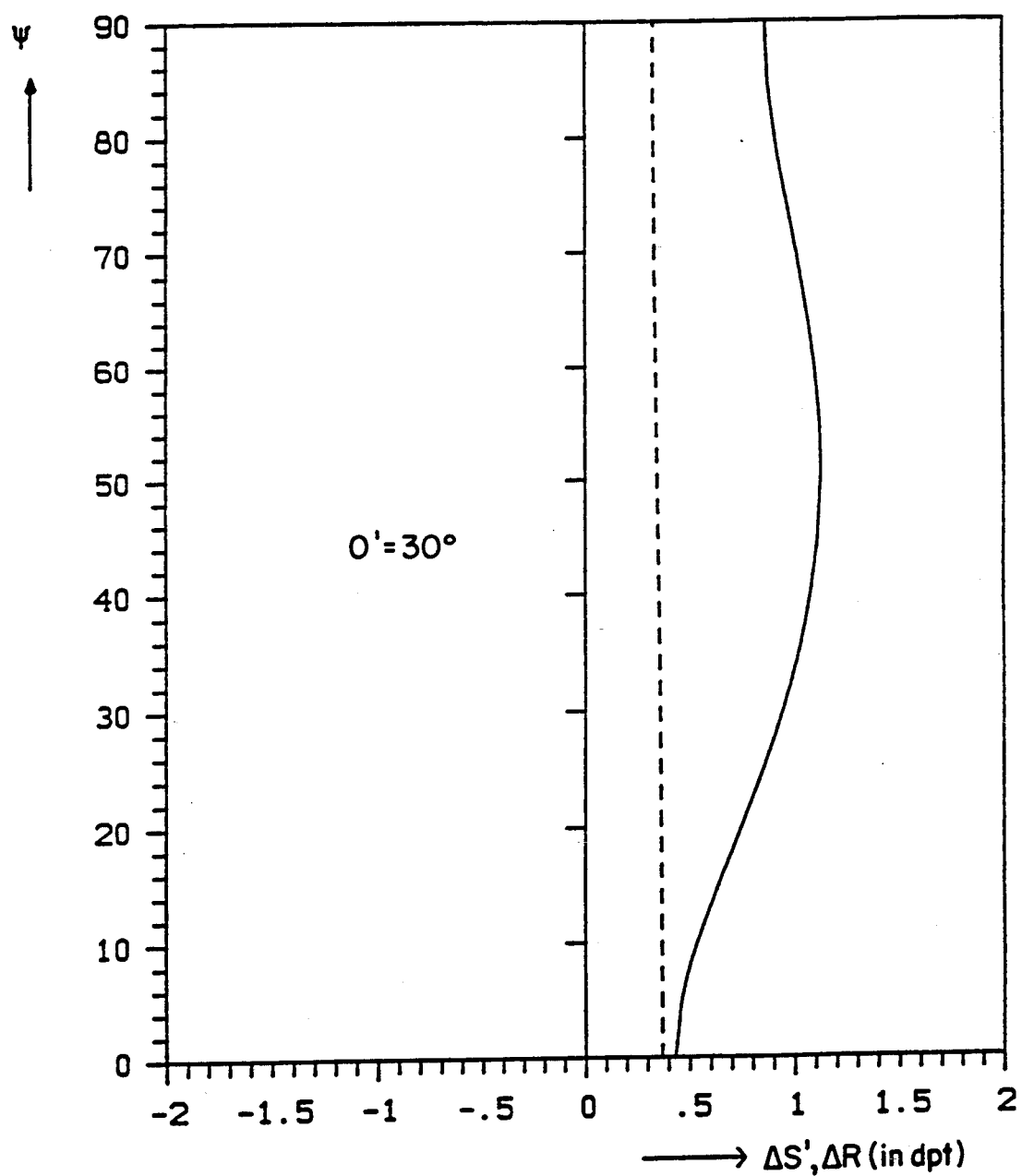
Figure 7A:
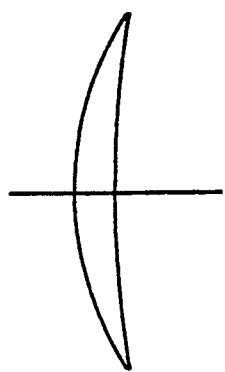
FIGS. 7a and 7b show a lens section.
Figure 7B:
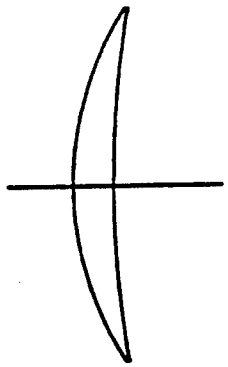
Figure 12:
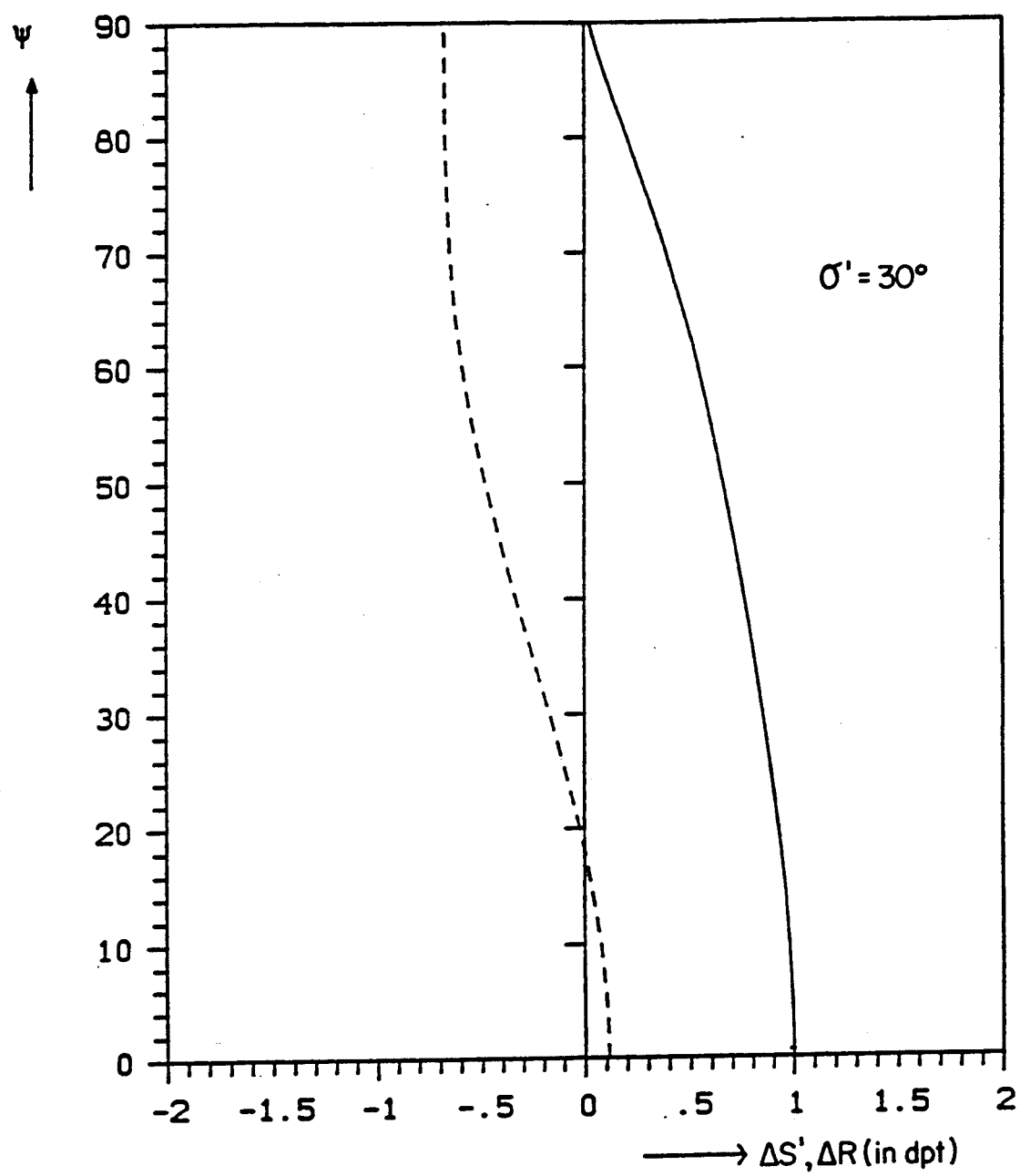
Figure 15:
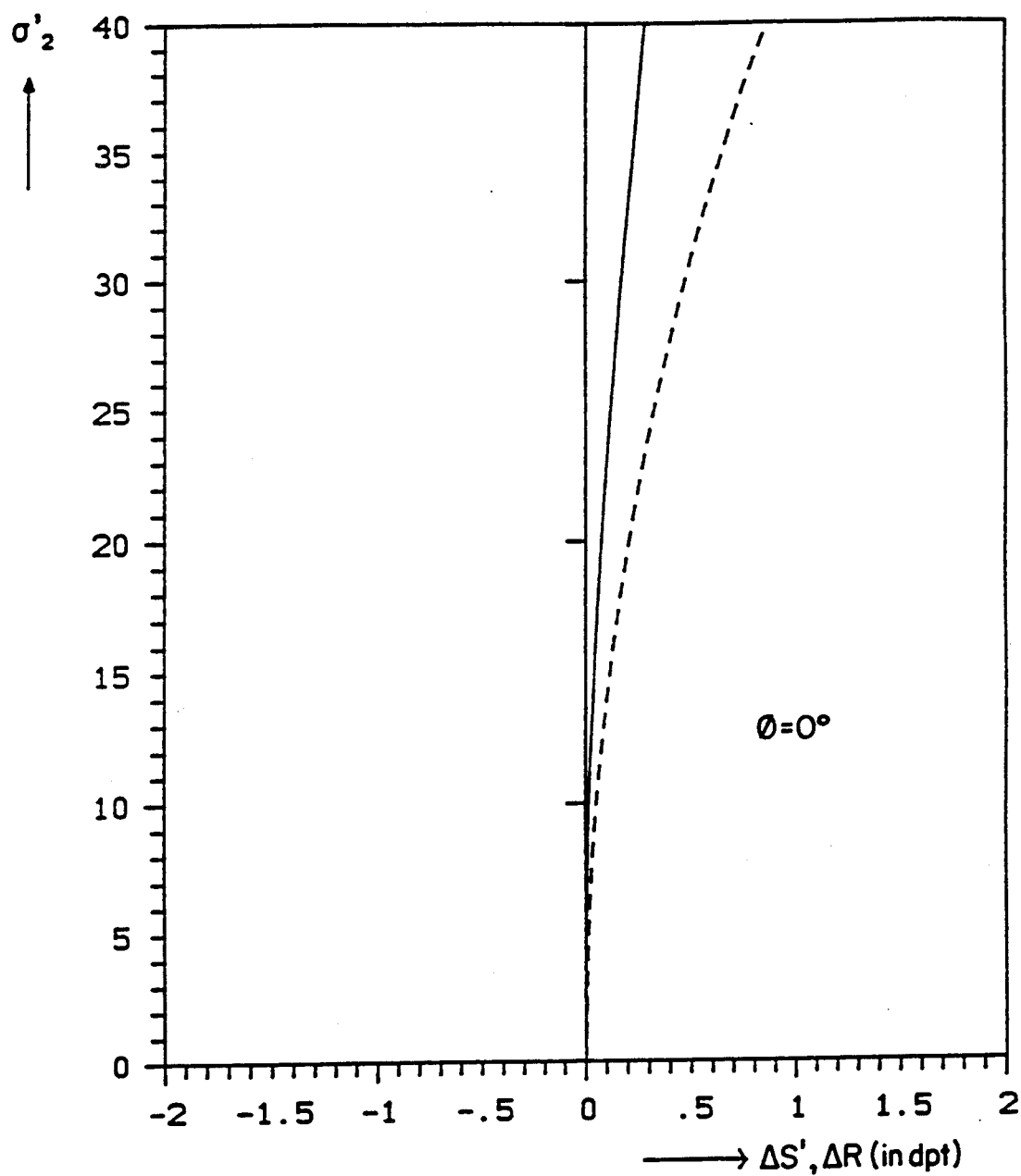
FIGS. 15 to 18 show the astigmatic deviation and the focussing error for a prior art ophthalmic lens having a cylindrical correction of +4 dpt., FIGS. 19a and b show a lens section, FIGS. 20a and b show the change in the refractive index.
Figure 16:
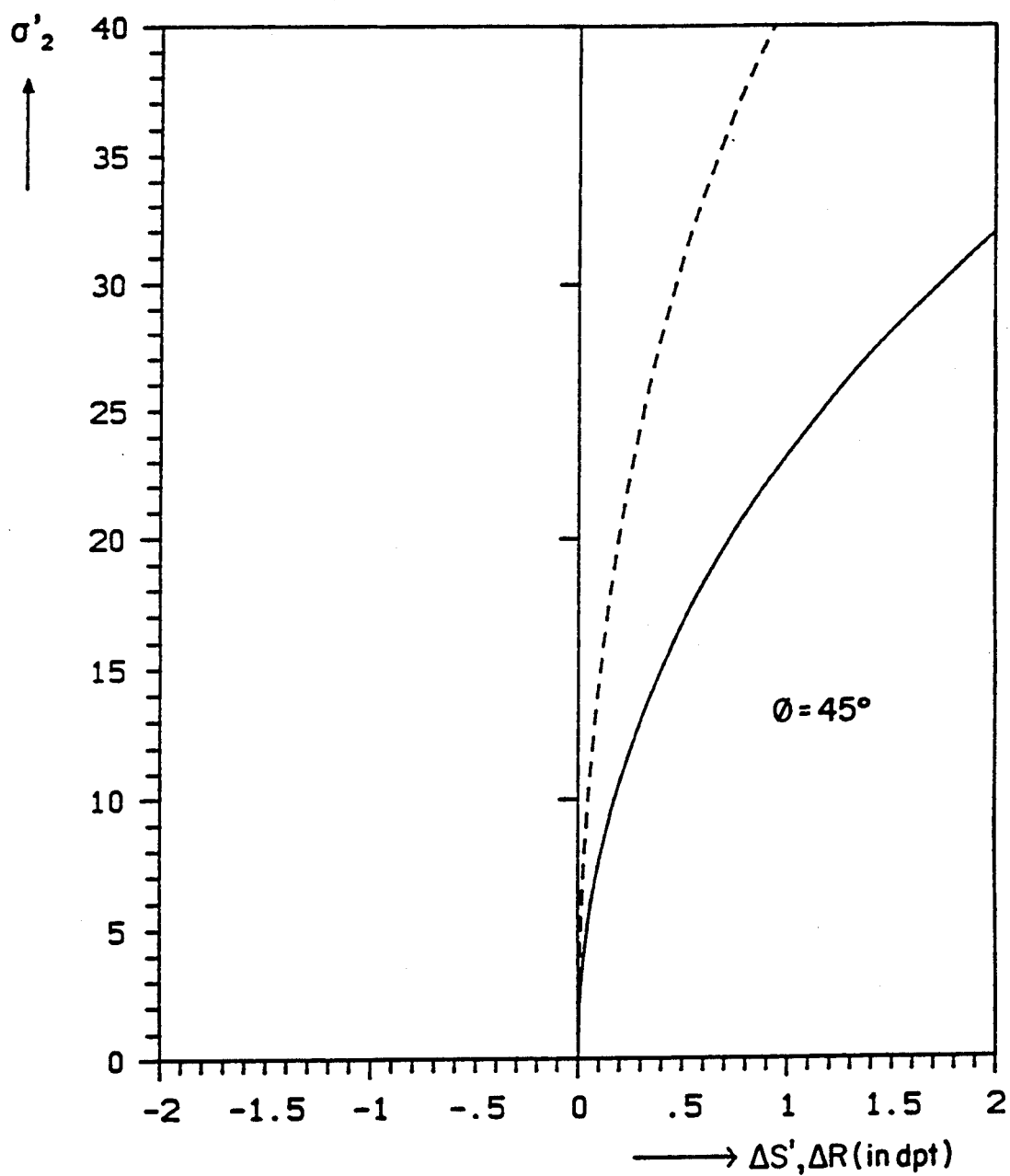
Figure 17:
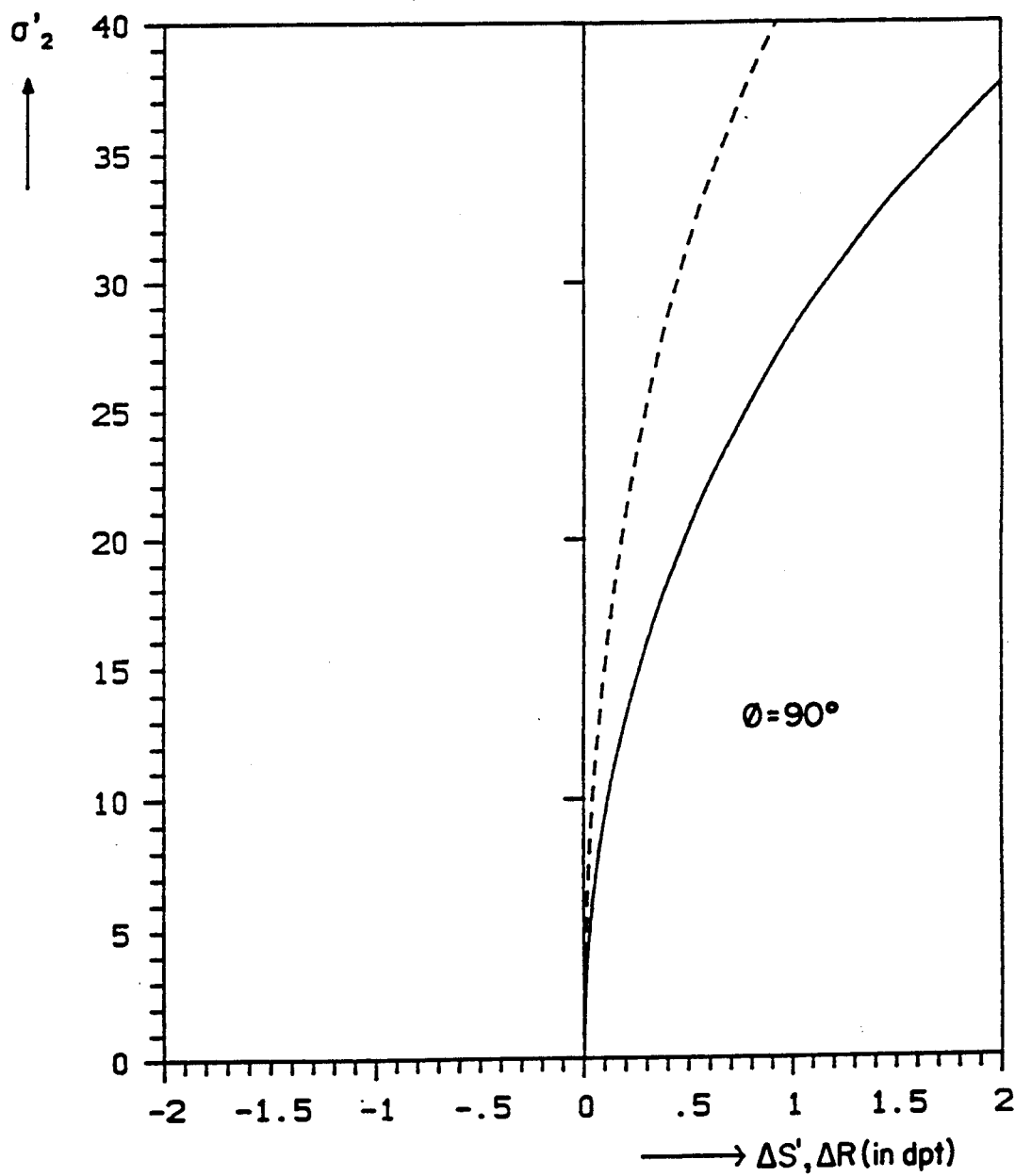
Figure 18:
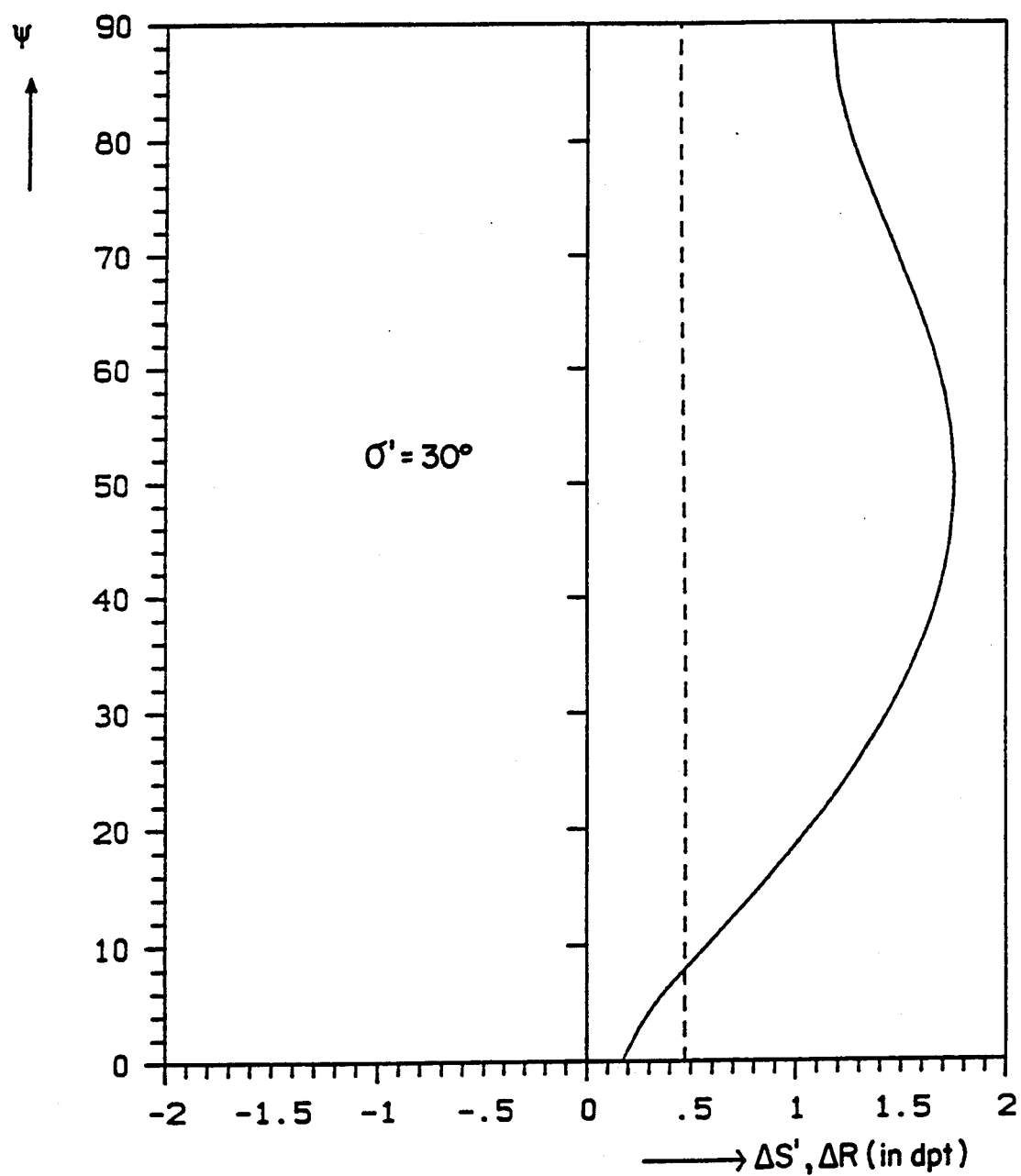
Figure 19A:
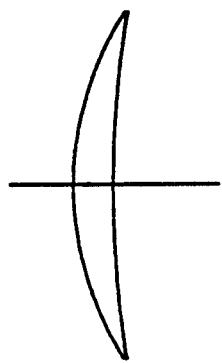

Furthemore, a comparison of FIG. 12 with FIG. 6, which show the aberrations on a cone with a constant angle of vision $\sigma'$, reveals that the invented ophthalmic lens has substantially better image properties.

It is particularly remarkable, however, that, despite the utilization of only one-dimensional gradients of the refractive index and consequently restricted possibilities of variation in correction, it possible to maintain specific marginal conditions for aberrations in addition to meeting the restrictions regarding to center and edge thickness:

In the ophthalmic lens of the present invention illustrated in FIGS. 7 to 12, the error correction is designed in such a manner that for $\phi=0°$ the focussing error R and for $\phi=90°$ astigmatism S' are approximately zero up to the angles of vision $\sigma'=30°$.

Figure 8A:
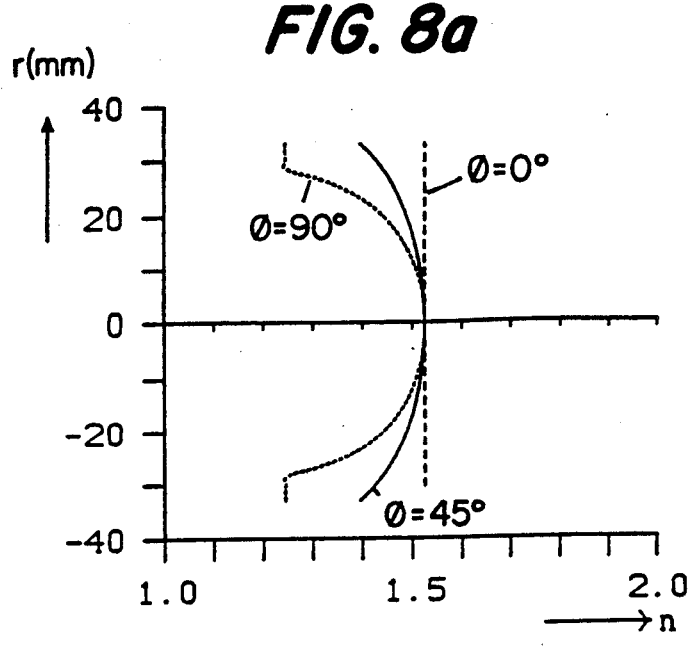
FIGS. 8a and 8b show the change in the refractive index.
Figure 8B:
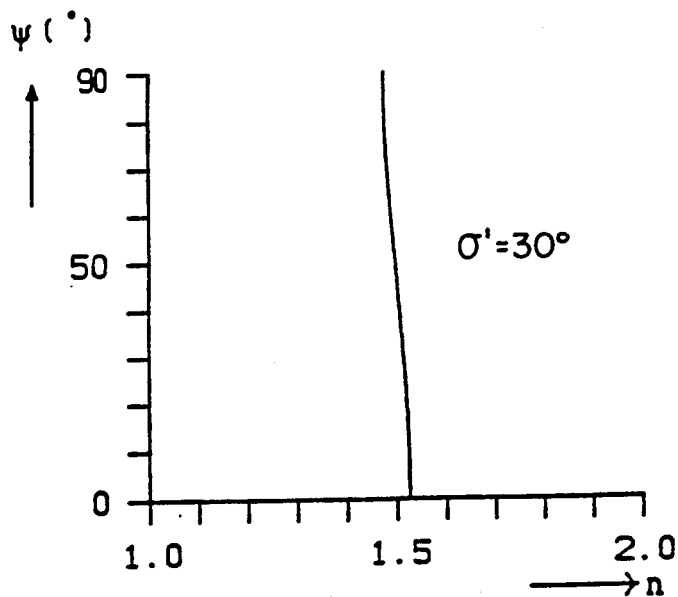
Figure 10:
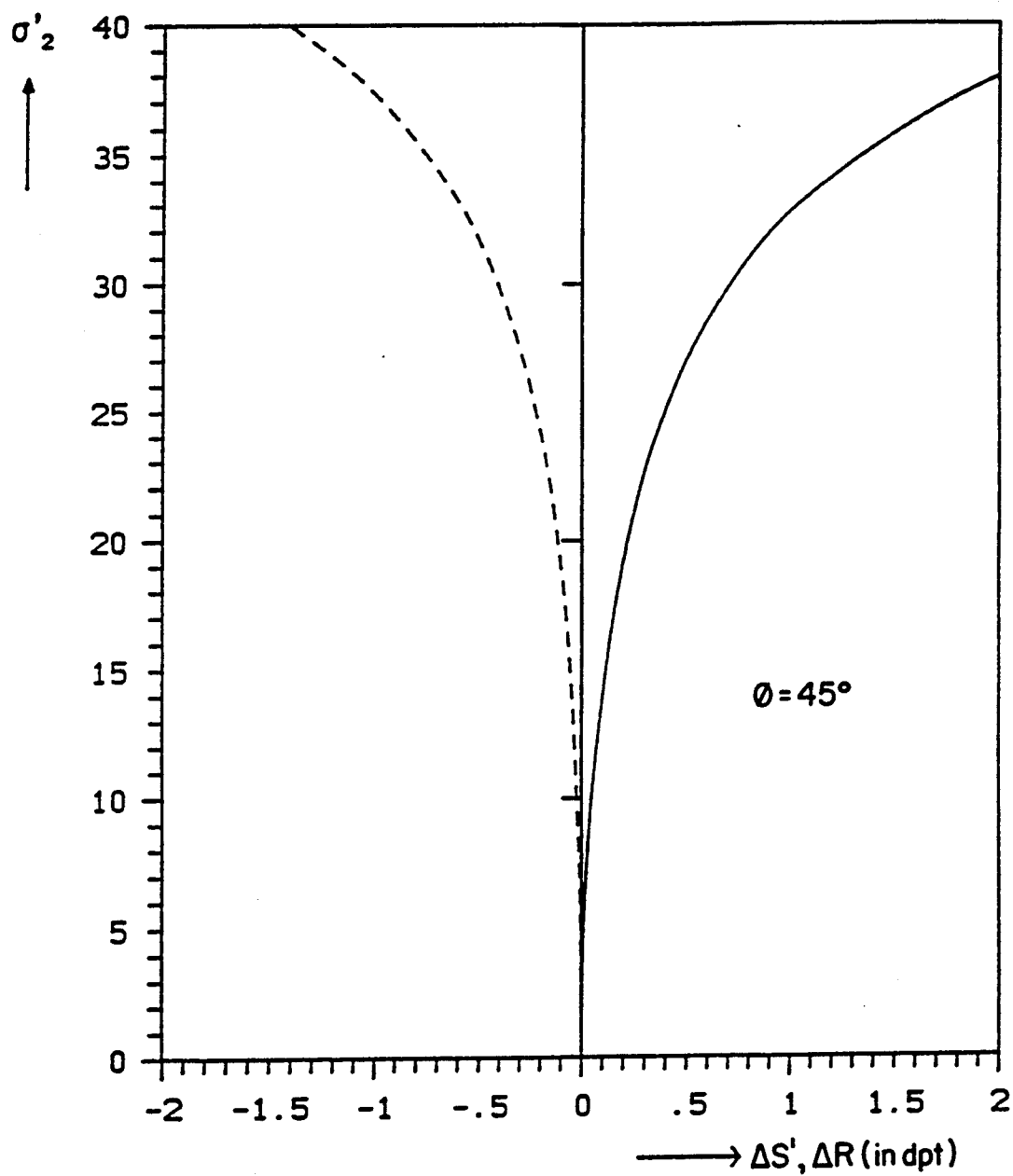
Figure 11:
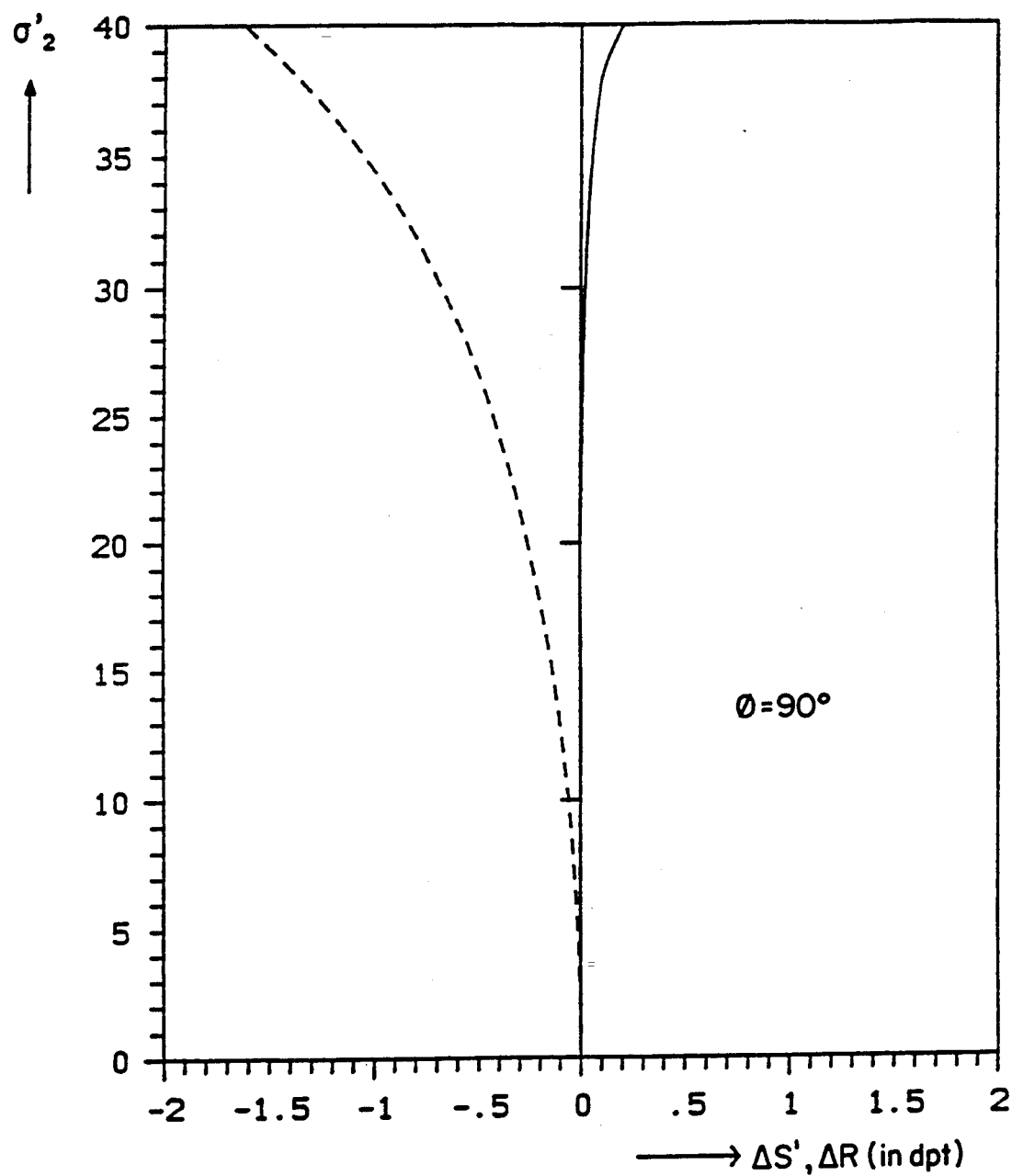

The calculation of the one-dimensional gradients of the refractive index n(y) is attained with spline functions in the illustrated preferred embodiment, the exact course is indicated in FIGS. 8a and 8b. If the refractive index n(y) attained by spline functions is approximated in the region of the optical axis with a Taylor series $$n(y) = n_o + n_{2y}*y^2 + \ldots$$

the coefficient yielded is $$n_{2y} = -1.661*10^{-4} [mm^{-2}].$$

FIGS. 13 to 18 depict another customary ophthalmic lens having a cylindrical correction of +4 dpt and a cylindrical axis of ($\phi=$) 0° as well as a uniform refractive index n=1.525.

The front surface is a barrel-shaped torus with a vertex refractive power D
$D_{1x} = 6.68$ dpt.
$D_{1y} = 10.23$ dpt.

The eye-facing surface is a spherical surface with $$D_{2x} = D_{2y} = -2.00 \text{ dpt.}$$

If such an ophthalmic lens has a diameter of 66 mm and a minimum edge thickness of 0.50 mm
its maximum edge thickness is 5.25 mm
and its center thickness 10.43 mm.

Thus the ophthalmic lens has a spherical correction of 5.0 dpt and a cylindrical correction of +4.00 dpt at an axial position of 0°.

FIGS. 19 to 24 show a first preferred embodiment of an invented ophthalmic lens having a cylindrical correction of +4 dpt and a cylindrical axis of ($\phi=$) 0° as well as a changing refractive index in accordance with the present invention, the variation of which is depicted in FIG. 20.

Both the front surface and the eye-facing surface are spherical surfaces with a vertex refractive power of D $$D_{1x} = D_{1y} = 6.82 \text{ dpt.}$$

$$D_{2y} = D_{2y} = -2.00 \text{ dpt.}$$

The cylindrical correction is produced by changing the refractive index n, which is a function of y.

If such an ophthalmic lens has a diameter of 66 mm and a uniform edge thickness of 0.50 mm,
the center thickness is 5.85 mm.

Figure 26A:
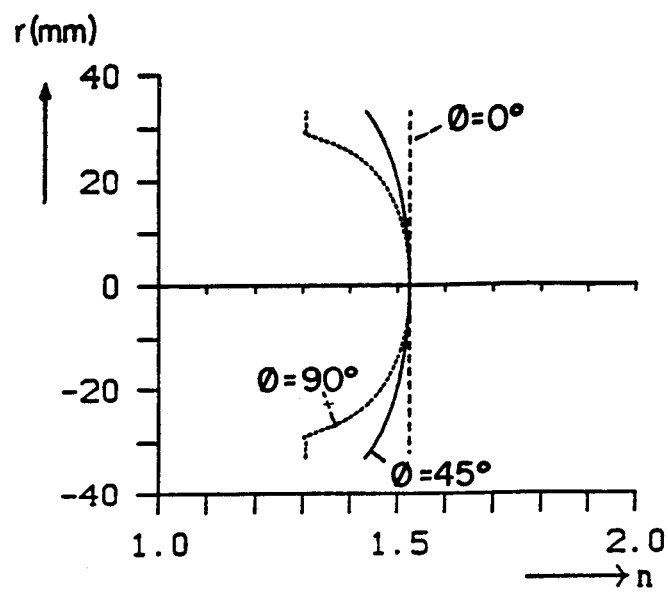
Figure 26B:
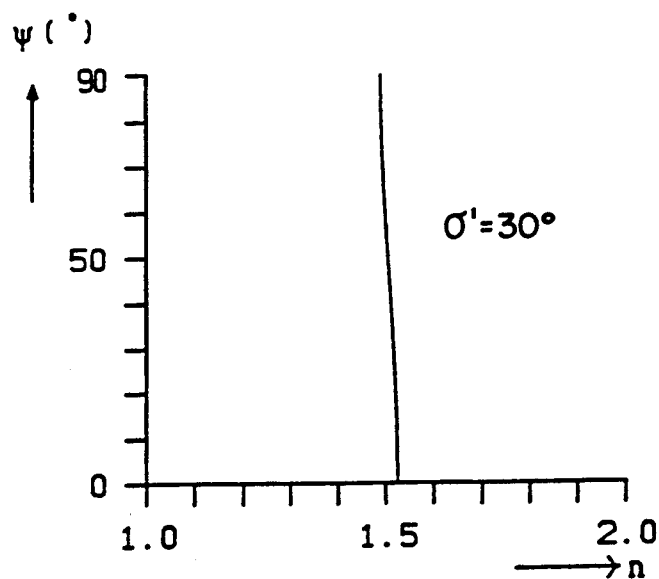
Figure 27:
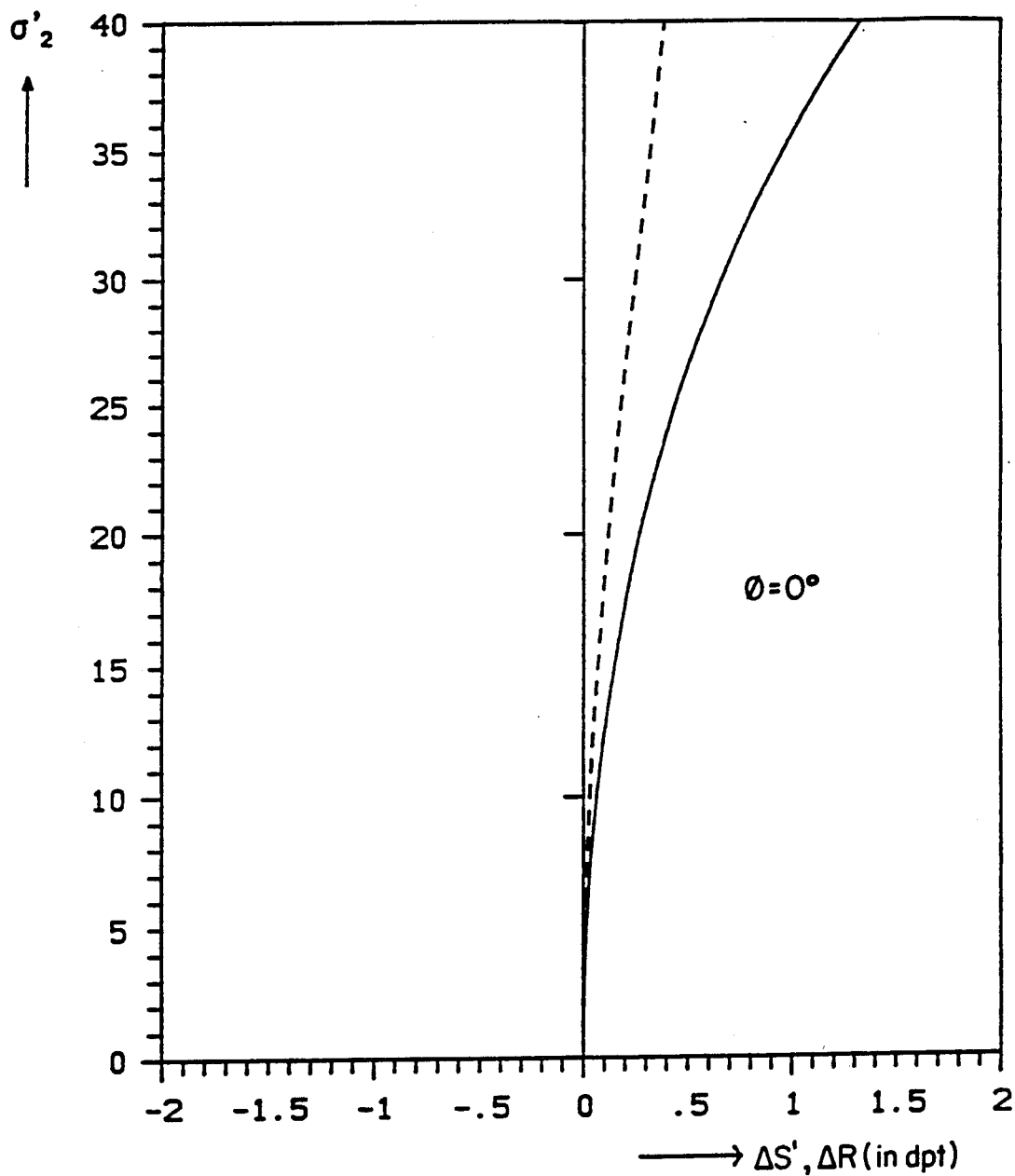
FIGS. 27 to 30 show the astigmatic deviation and the focussing error for a second preferred embodiment having a cylindrical correction of +4 dpt.
Figure 28:
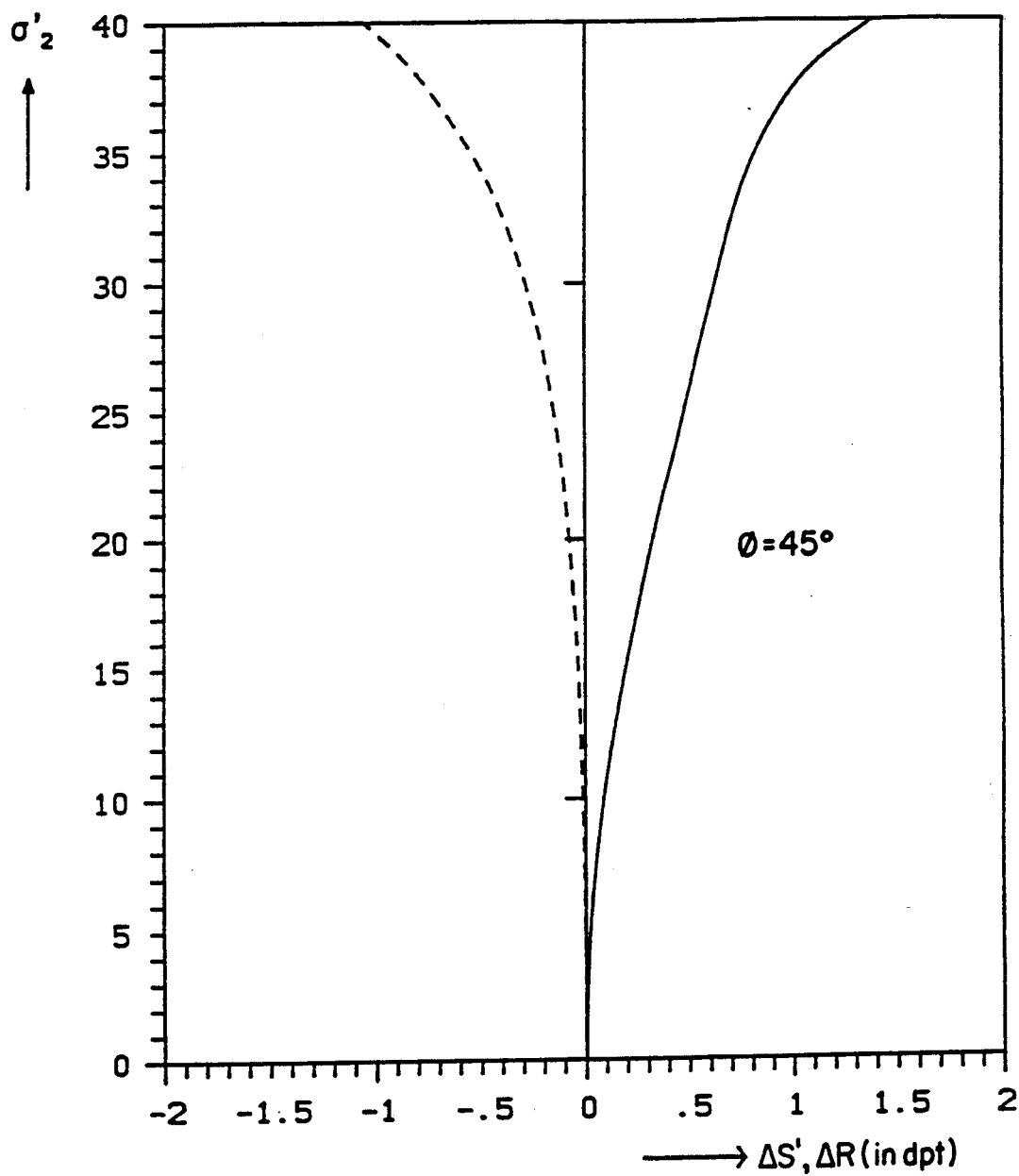
Figure 29:
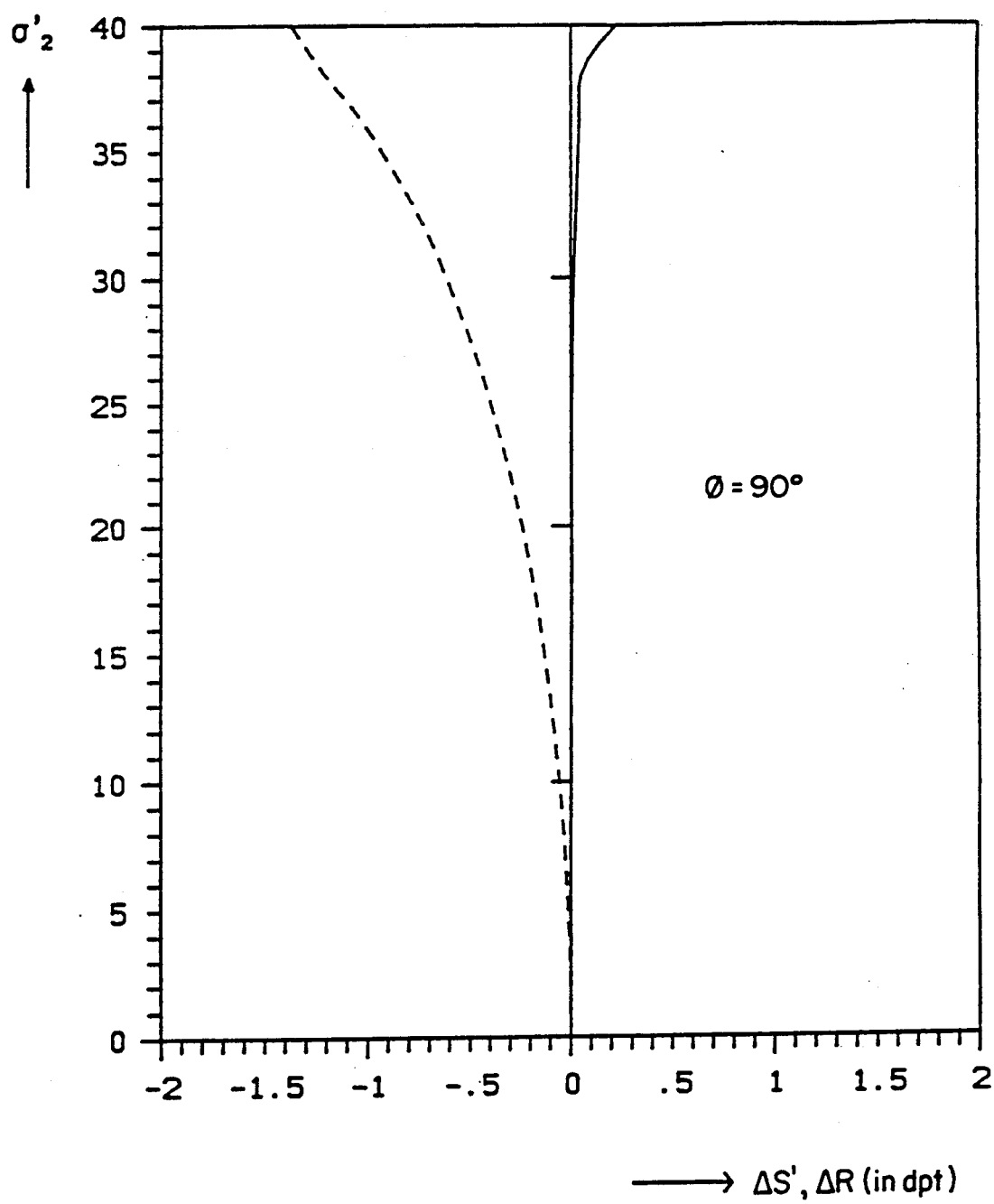
Figure 30:
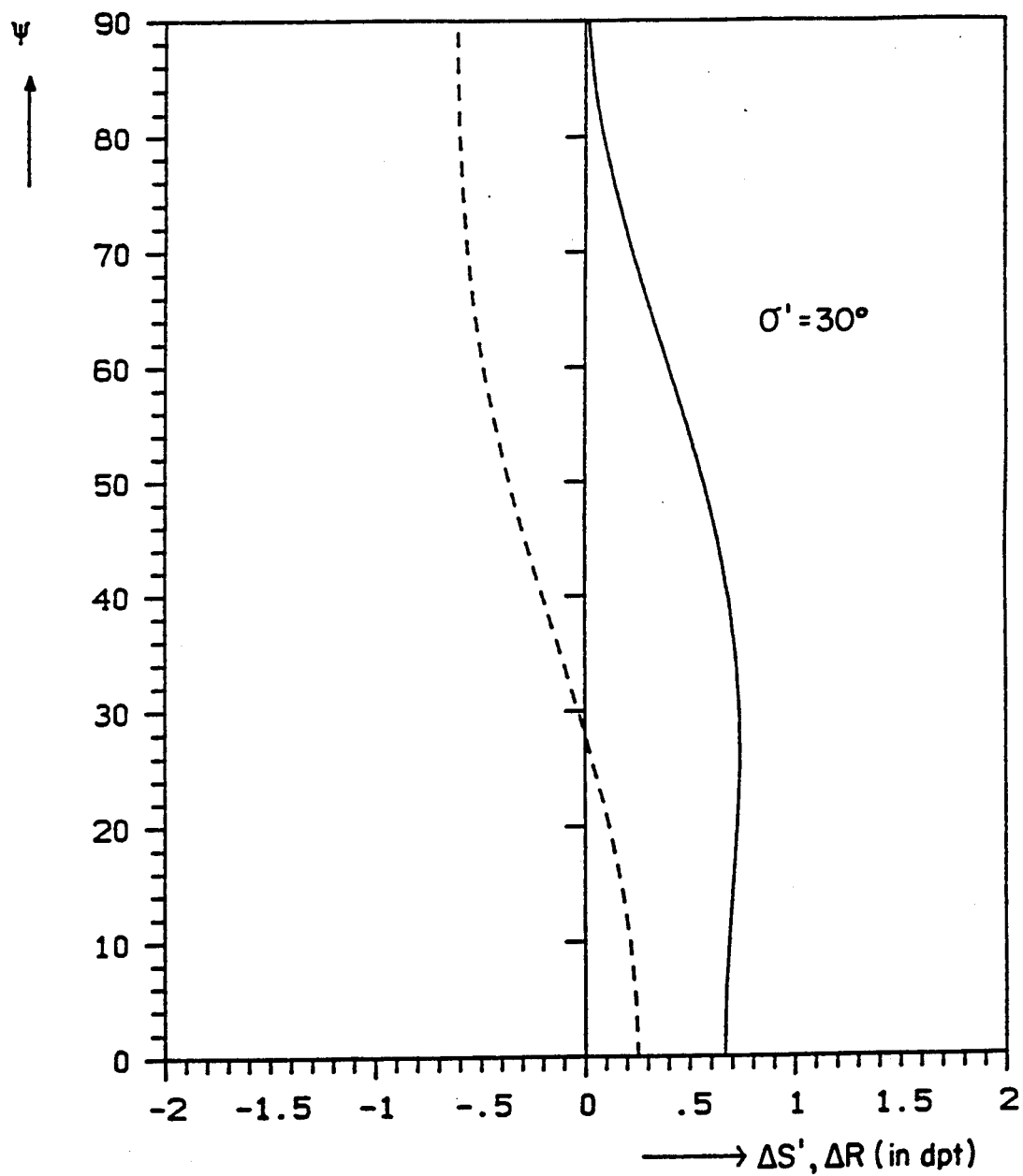

FIGS. 25 to 30 show a second preferred embodiment of the ophthalmic lens of the present invention having a cylindrical correction of +4 dpt and a cylindrical axis of ($\phi=$) 0° as well as also with a refractive index changing in accordance with the present invention, the variation of which is depicted in FIG. 26.

The front surface is a barrel-shaped torus having a vertex refractive power D
$D_{1x} = 6.75$ dpt.
$D_{1y} = 8.59$ dpt.

The eye-facing surface is a spherical surface with $$D_{2x} = D_{2y} = -2.00 \text{ dpt.}$$

If such an ophthalmic lens has a diameter of 66 mm and a
mimimum edge thickness of 0.50 mm,
the maximum edge thickness is 2.83 mm
and the center thickness 8.09 mm Thus the ophthalmic lens provides aspherical correction of 5.0. dpt and, without taking into account the refractive index gradient, a cylindrical correction of +2.00 dpt at an axial position of 0°. Additional cyclindrical correction of +2.00 dpt at an axial position of 0° is produced by the means of the one-dimensional course n(y) of the refractive index.

A comparison of the two invented ophthalmic lenses with a customary lens reveals the following:

The center thickness, i.e. the critical thickness in an ophthalmic lens of positive power, is reduced by approximately 75% and the maximum edge thickness even by 90%, without the aberrations worsening in the preferred embodiment in which all of the cyclindrical correction is attained by the refractive index gradient. On the contrary the invented ophthalmic lens even has more favorable image properties than the customary toric lens with spherical main sections. In particular, the foccusing error R never becomes positive and therefore can be compensated for by means of negligible adaption.

Like the invented preferred embodiment providing cylindrical correction of +2.0 dpt, with this preferred embodiment it is also remarkably possible to maintain specific marginal conditions for aberrations in addition to meeting the requirements regarding center and edge thickness despite the use of an only one-dimensional gradient of the refractive index and consequently restricted possiblity of variation in correction:

In the preferred embodiment illustrated in FIGS. 19 to 24 the error correction is designed in such a manner that for all the values of $\phi$ the focussing error R <0 and for $\phi=90°$ astigmatism S' is approximately zero up to the angles of vision $\sigma \approx 30°$.

Figure 20A:
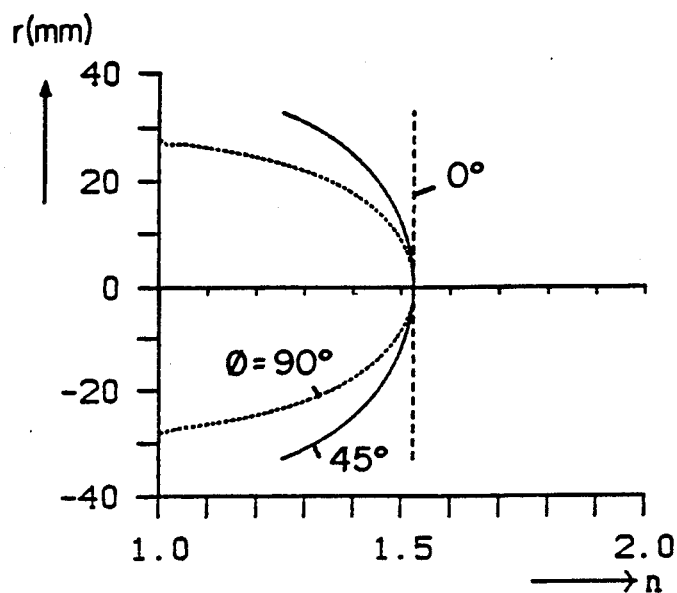
Figure 19B:
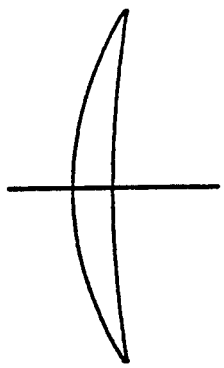
Figure 20B:
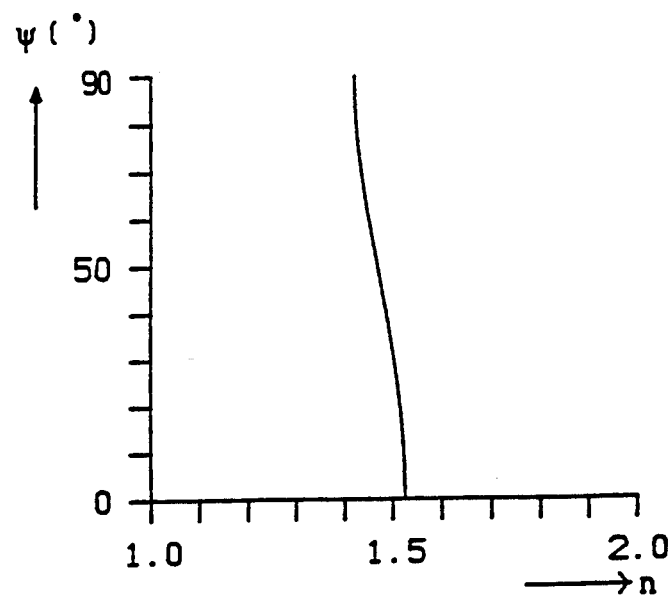
Figure 21:
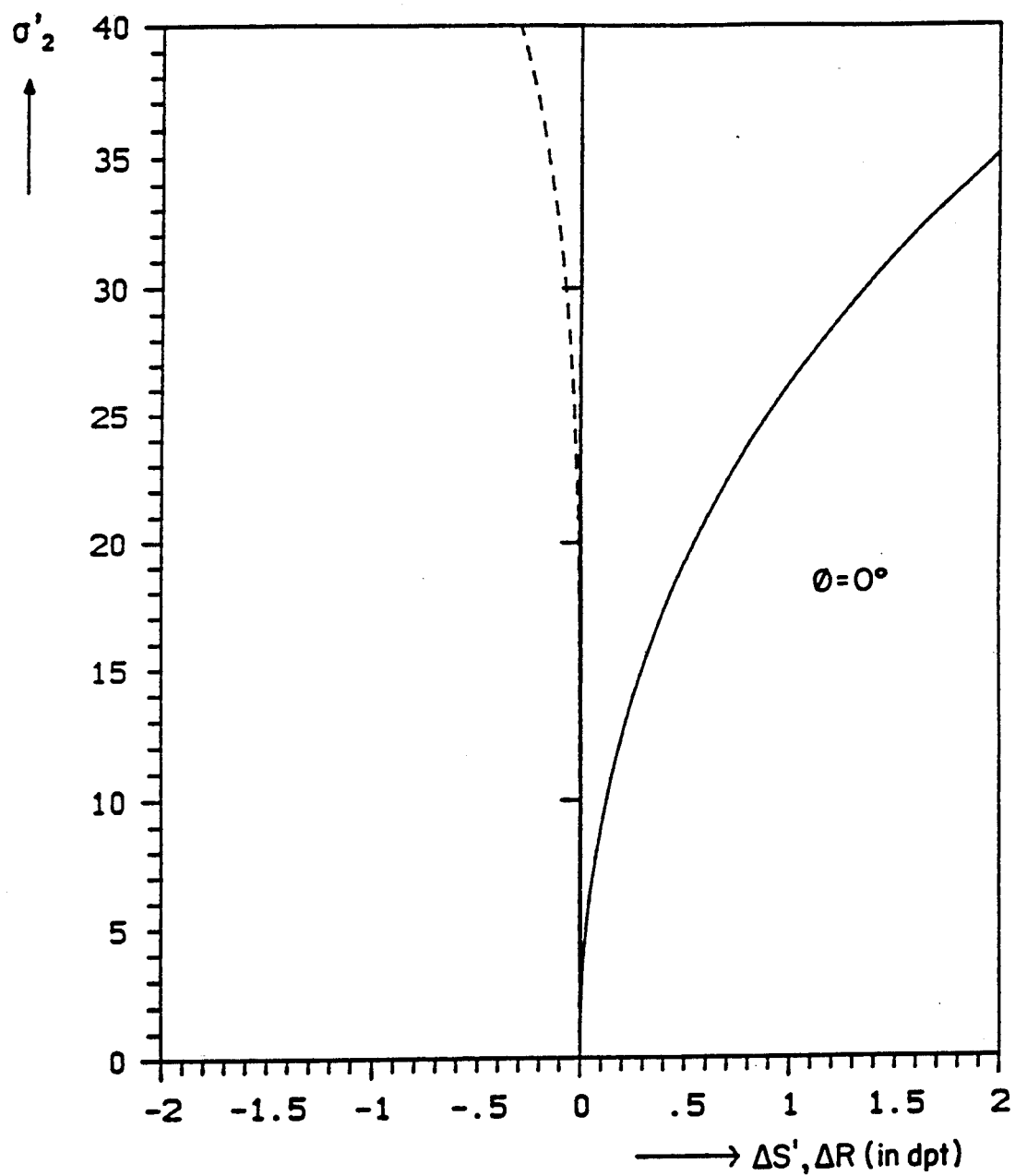
FIGS. 21 to 24 show the astigmatic deviation and the focussing error for a first preferred embodiment having a cylindrical correction of +4 dpt., FIGS. 25a and b show a lens section, FIGS. 26a and b show the change in the refractive index.
Figure 22:
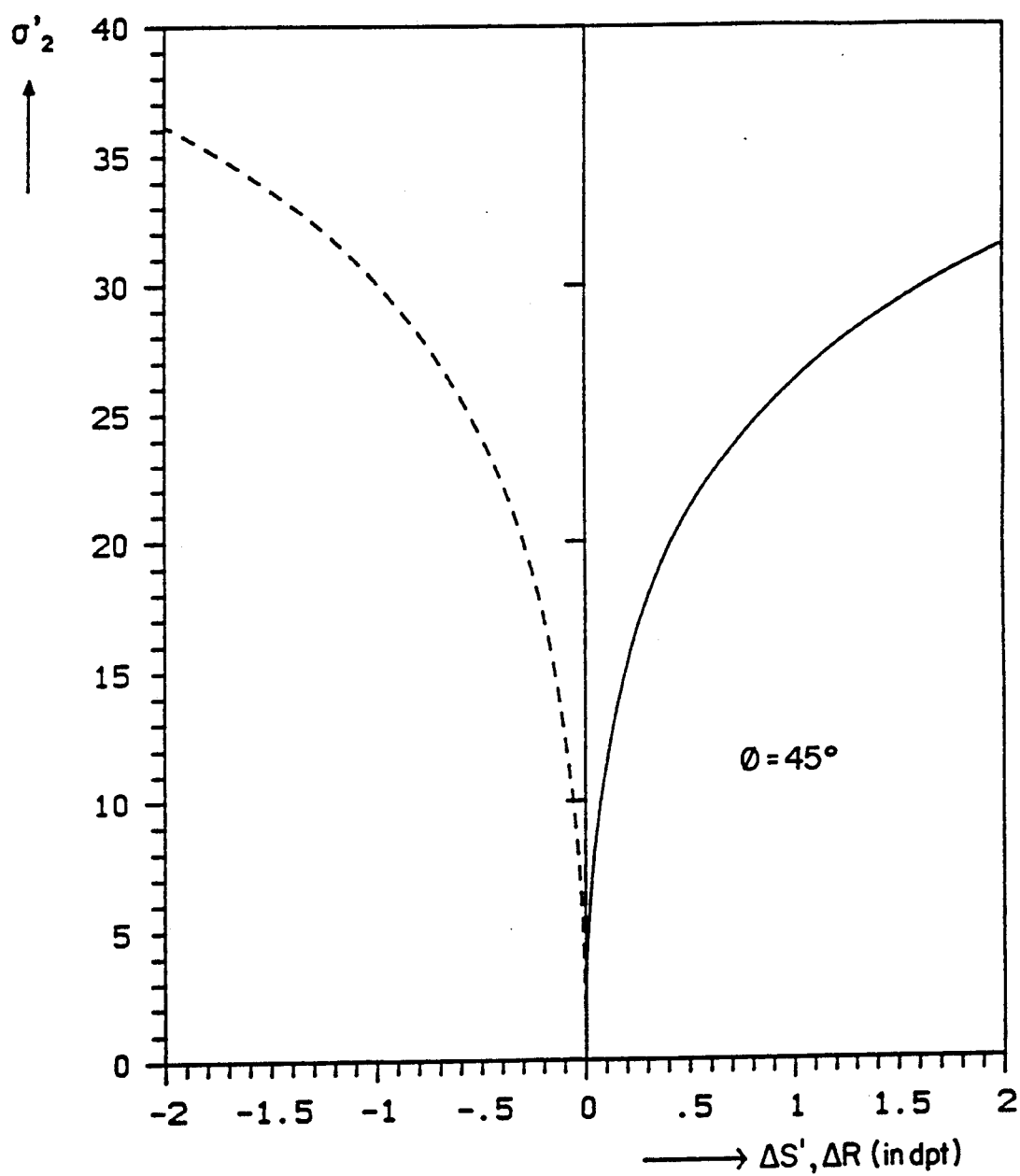
Figure 23:
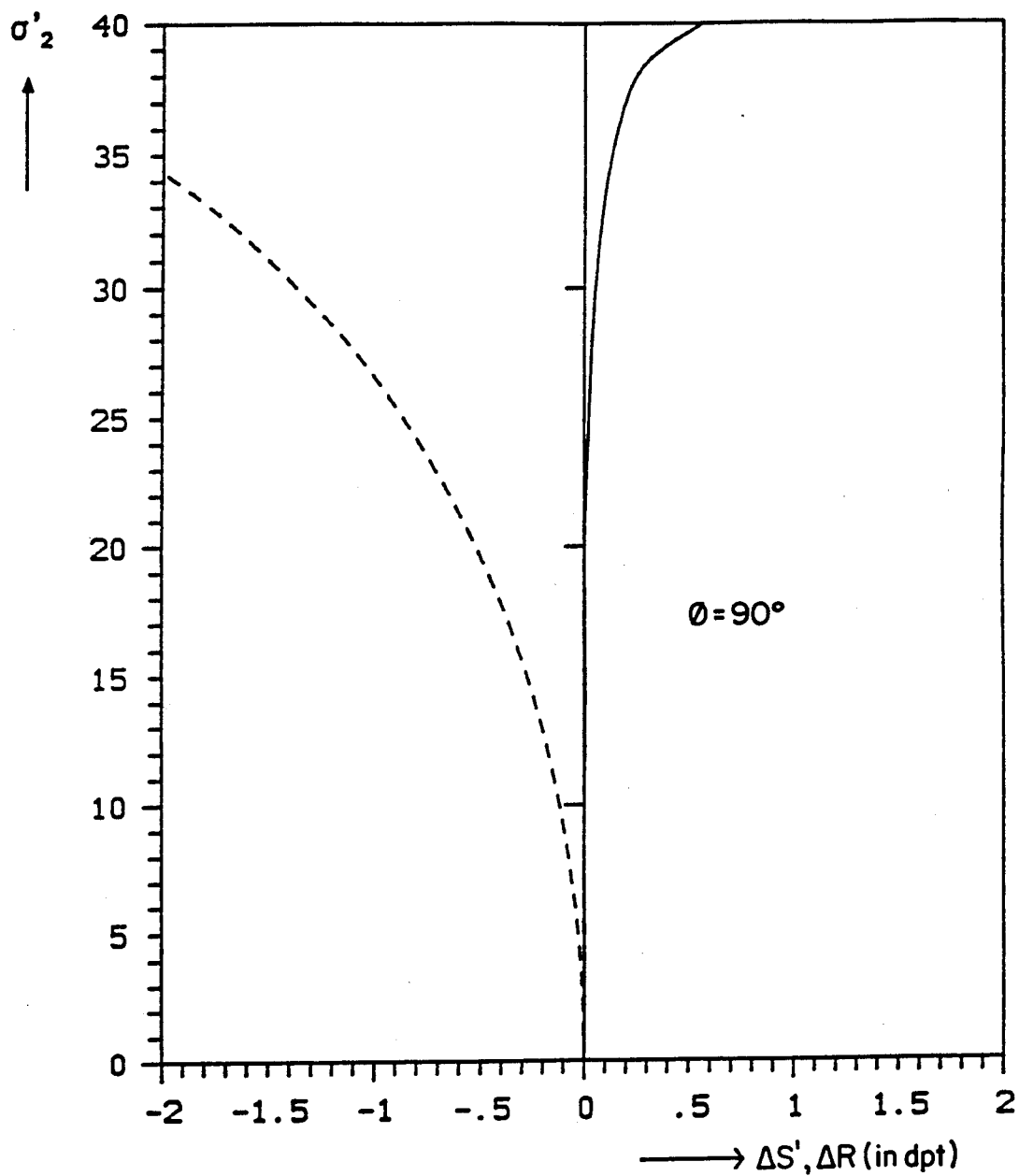
Figure 24:
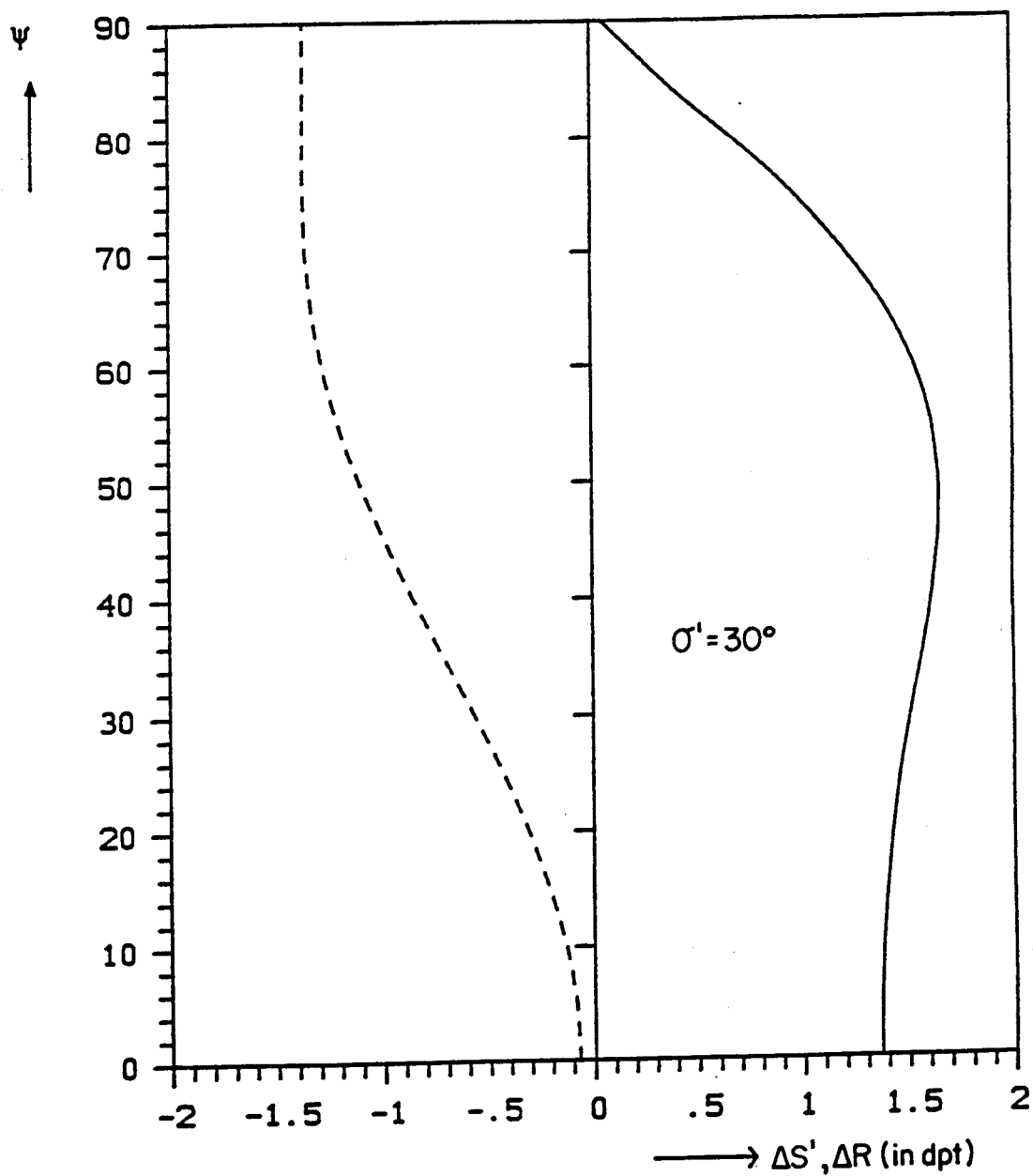
Figure 25A:
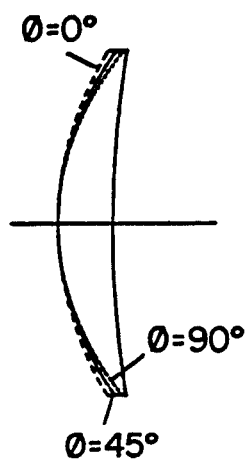
Figure 25B:
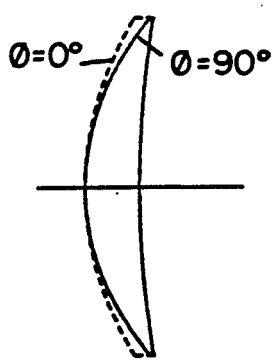

The one-dimensional gradient of the refractive index for this preferred embodiment is also calculated with spline functions, the exact course is indicated in the partial FIGS. 20a and b. If the refractive index n(y) resulting with spline functions is appoximated with a Taylor series in the region of the optical axis $$n(y) = n_o + n_{2y}*y^2 + \ldots,$$

in the vicinity of the axis for the coefficient is yielded $$n_{2y} = -3.314*10^{-4} [mm^{-2}].$$

In the preferred embodiment in which the "entire cylindrical correction" is attained half by means of the "toric surface design" and half by means of the refractive index gradient, the center thickness, i.e. the critical thickness in a ophthalmic lens of positive power, is, however, negligibly greater than in the first preferred embodiment, in which the entire cylindrical correction was attained by means of the refractive index gradient. Yet compared to the customary ophthalmic lens, it is reduced by approximately 22% and the maximum edge thickness even by approximately 45%. In addition, the absolute values of the aberrations S' and R are distinctly smaller than in the first preferred embodiment and in the customary ophthalmic lens. The negligible positive values of R at $\phi \approx 0°$ is of no significance as the absolute value is very small.

With this preferred embodiment, too, it is possible despite the utilization of an only one-dimensional gradient of the refractive index, which only changes along the lower refracting main section and is mirror symmetrical to the plane of the second (other) main section and consequently restricted possibilty of variation in correction, to maintain specific marginal conditions for the aberrations in addition to meeting requirements regarding center and edge thickness.

In the invented embodiment illustrated in FIGS. 25 to 30, the error correction is designed in such a manner that the for $\phi = 90°$ astigmatism S' is approximately zero up to the angles of vision $\sigma = 30°$.

The one-dimensional gradient of the refractive index is also calculated for the second preferred embodiment for a cylindrical correction of $+4.0$ dpt using spline functions, the exact course is indicated in the partial FIGS. 26$a$ and $b$. If the refractive index n(y) resulting with the spline functions is approximated once more in the optical axis with a Taylor series, for the coefficient $n_{2y}$ is yielded $$n_{2y} = -1.177 * 10^{-4} [mm^{-2}].$$

In the preceding section the present invention has been described using preferred embodiments without the intention of limiting the scope of the overall inventive concept - to utilize a gradient of the refractive index having a preferred direction in the direction of the critical main section:

There are, of course, many very varied possible modifications within this overall inventive concept:

By way of illustration, a refractive index course may be selected in which the refractive index is dependent on x and/or changes in the axial direction, instead of the one-dimensional gradient used in the preferred embodiments, in which the refractive index is only dependent on y. With a gradient like the former, aberrations in the peripheral regions and between the main sections can be further reduced. It is also possible to utilize an aspheric or toric lens, i.e. a lens having at least one aspheric main section provided with a refractive index gradient according to the present invention, instead of a lens with spherical surfaces or spherical main sections. By this means it is also possible to further reduce aberrations and/or the critical thickness as well as the variation of the edge thicknesses.

In the illustrated preferred embodiments the refractive index changes practically up to the edge of the lens. However, it is also possible to permit only one variation of the refractive index up to the angle of vision $\sigma' \approx 30°$ and to hold the refractive index constant with larger angles of vision, thereby facilitating the manufacture of the lens, which is already much simplified compared to other proposals for refractive index gradients due to only one-dimensional main variation.

Needless to say that in the case of other axial positions of the eye, for which an invented lens is to be employed, the selected main sections are to be appropriately modified from the illustrated preferred embodiments.

Furthermore, in the aforedescribed preferred embodiments, a gradient was employed which only changes along the critical main section and mirror symmetrically to the second main section. Naturally, it is also possible to relinquish the mirror symmetry requirement for correction of the so-called "astigmatism obliqus" while taking into account the Listing principle and/or use in addition two-dimensional gradients.

Also the fact that all the preferred embodiments described in detail in the foregoing are lenses of positive power is not to be construed as a restriction of the overall inventive concept. For an expert skilled in the art it presents no difficulty to apply the technical principles hereof to lenses of negative power the edge thickness of which is to be reduced or to lenses in which one main section is of positive power and the other of negative power and in which the center thickness and the edge thickness are to be reduced accordingly.

The invented ophthalmic lenses can be manufactured by means of one of the processes described in the published relative literature. In this matter reference is made to the survey mentioned in the introduction hereto.

What I claim is:

1. An ophthalmic lens for use in the correction of astigmatism having two surfaces including a front surface and an eye-facing surface, wherein, in order to reduce one of a critical thickness and a variation of an edge thickness along the circumference of said lens, the refractive index changes at least along a critical main section in such a manner that at least part of a cylindrical correction is attained by the variation of said refractive index.

2. An ophthalmic lens according to claim 1, wherein said variation of the refractive index along said critical main section is mirror-symmetrical to the plane of an other non-critical main section.

3. An ophthalmic lens according to claim 2, wherein said refractive index is constant along surfaces which are parallel planes to said other main section.

4. An ophthalmic lens according to one of the claims 1 to 3, wherein for a predetermined range of cylindrical corrections, said cylindrical correction is attained solely by said variation of said refractive index.

5. An ophthalmic lens according to claim 4, wherein both said front surface and said eye-facing surface are spherical surfaces.

6. An ophthalmic lens according to claim 2 or 3 wherein at least one of said two surfaces is a rotationally symmetrical aspheric surface, the course of which reduces aberrrations at least along said other main section.

7. An ophthalmic lens according to one of the claims 1 to 3, wherein one of said two surfaces is an atoric surface.

8. An ophthalmic lens according to one of the claims 1 to 3, wherein in the description of the refractive index function n(y) using a Taylor series $$n(y) = n_o + n_{2y} * y^2 + \ldots$$

the following equation defines the coefficient $n_{2y} mm^{-2}$:

$$n_{2y} = (1 - d*D_{1y}/n_o)*D_{1y}/(1 - d*D_{1y}/n_o) - D_{1x}/(1 - d*D_{1x}/n_o) + D_{2y} - D_{2x} - Zy1/(2*d)$$

whereby:

$D_{1x \, or \, y}$ being the surface refractive value of said front surface in the x or y direction, $D_{2x \, or \, y}$ the surface refractive value of said eye-facing surface in the x or y direction, $n_o$ said refractive index in the optical axis, d said center thickness, and Zy1 $S'_{oy} - S'_{ox}$ (definition of the cylindrical correction).

* * * * *